(12) United States Patent
Shin et al.

(10) Patent No.: US 11,994,744 B2
(45) Date of Patent: May 28, 2024

(54) OPTICAL IMAGING SYSTEM

(71) Applicant: Samsung Electro-Mechanics Co., Ltd., Suwon-si (KR)

(72) Inventors: Kil Soo Shin, Suwon-si (KR); Yong Joo Jo, Suwon-si (KR); Il Yong Park, Suwon-si (KR); Hyo Jin Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 603 days.

(21) Appl. No.: 17/007,637

(22) Filed: Aug. 31, 2020

(65) Prior Publication Data
US 2021/0063688 A1   Mar. 4, 2021

(30) Foreign Application Priority Data
Aug. 30, 2019  (KR) .................. 10-2019-0107669

(51) Int. Cl.
*G02B 9/60* (2006.01)
*G02B 3/04* (2006.01)
(Continued)

(52) U.S. Cl.
CPC ............... *G02B 9/60* (2013.01); *G02B 7/38* (2013.01); *G02B 13/18* (2013.01); *G02B 3/04* (2013.01)

(58) Field of Classification Search
CPC . G02B 9/60; G02B 7/38; G02B 13/18; G02B 3/04; G02B 13/0045; G02B 7/1805; G02B 7/10; G02B 7/02; G02B 7/021; G02B 5/04; G02B 5/02; G02B 13/007; G02B 13/0015; G02B 13/0065; G02B 15/14;
(Continued)

(56) References Cited

U.S. PATENT DOCUMENTS 6,867,933 B2 * 3/2005 Matsusaka ........... G02B 13/006
    348/335
9,482,846 B2   11/2016 Kwon et al.
(Continued)

FOREIGN PATENT DOCUMENTS

CN   103376536 A   10/2013
CN   206710684 U   12/2017
(Continued)

OTHER PUBLICATIONS

Korean Office Action dated Aug. 2, 2022, in counterpart Korean Patent Application No. 10-2020-0109415 (9 pages in English, 6 pages in Korean).
(Continued)

*Primary Examiner* — Marin Pichler
*Assistant Examiner* — Justin W. Hustoft
(74) *Attorney, Agent, or Firm* — NSIP Law

(57) ABSTRACT

An optical imaging system includes a first lens, a second lens, a third lens, a fourth lens, and a fifth lens sequentially disposed in ascending numerical order along an optical axis from an object-side surface of the first lens toward an imaging plane of the optical imaging system, wherein the conditional expression $11 \leq TTL/IMG\_HT$ is satisfied, where TTL is a distance along the optical axis from the object-side surface of the first lens to the imaging plane, and IMG_HT is one-half of a diagonal length of the imaging plane.

22 Claims, 28 Drawing Sheets

(51) Int. Cl.
*G02B 7/38* (2021.01)
*G02B 13/18* (2006.01)
(58) Field of Classification Search
CPC .......... G02B 6/003; G02B 6/425; G02B 9/62;
G02B 3/00; G02B 3/0037; G02B 3/14;
G02B 17/008; G02B 1/041; G02B
27/0955; B02B 27/0972; B02B 27/0938;
B02B 27/0983; B02B 27/0966; B02B
27/0961; B02B 27/0955
See application file for complete search history.

(56) References Cited

U.S. PATENT DOCUMENTS

| | | | |
|---|---|---|---|
| 10,126,528 B2 | 11/2018 | Kubota et al. | |
| 2004/0051960 A1* | 3/2004 | Mihara | G02B 13/007 359/686 |
| 2008/0106800 A1 | 5/2008 | Shin | |
| 2010/0165120 A1* | 7/2010 | Chang | H04N 23/45 348/207.99 |
| 2013/0258162 A1 | 10/2013 | Tomioka | |
| 2013/0286486 A1 | 10/2013 | Hsieh et al. | |
| 2014/0043690 A1 | 2/2014 | Yamamoto | |
| 2015/0109524 A1* | 4/2015 | Laroia | H04N 23/51 348/369 |
| 2015/0198784 A1* | 7/2015 | Bone | G02B 13/0065 359/708 |
| 2016/0097915 A1 | 4/2016 | Chung et al. | |
| 2016/0170184 A1 | 6/2016 | Tsai et al. | |
| 2017/0010448 A1 | 1/2017 | Tsai et al. | |
| 2017/0212336 A1 | 7/2017 | Ko | |
| 2017/0242225 A1* | 8/2017 | Fiske | H04N 23/57 |
| 2017/0315334 A1* | 11/2017 | Liao | G02B 9/62 |
| 2017/0322394 A1* | 11/2017 | Chou | G02B 13/0055 |
| 2018/0024314 A1 | 1/2018 | Tashiro | |
| 2018/0059376 A1* | 3/2018 | Lin | G02B 13/0065 |
| 2018/0188501 A1 | 7/2018 | Lee et al. | |
| 2018/0364455 A1 | 12/2018 | Chen et al. | |
| 2019/0041554 A1 | 2/2019 | Shih et al. | |
| 2019/0212529 A1 | 7/2019 | Ko | |
| 2020/0150406 A1 | 5/2020 | Chen et al. | |
| 2020/0249445 A1 | 8/2020 | Hu et al. | |

FOREIGN PATENT DOCUMENTS

| | | | | |
|---|---|---|---|---|
| CN | 108333723 A | | 7/2018 | |
| CN | 106199918 B | | 10/2018 | |
| CN | 109387923 A | | 2/2019 | |
| CN | 209028283 U | | 6/2019 | |
| CN | 110109235 A | | 8/2019 | |
| JP | 2003204106 A | * | 7/2003 | .......... G02B 6/4206 |
| JP | 2011-123289 A | | 6/2011 | |
| KR | 10-2006-0102466 A | | 9/2006 | |
| KR | 10-0800811 B1 | | 2/2008 | |
| KR | 10-1963591 B1 | | 4/2019 | |
| TW | M476934 U | | 4/2014 | |
| TW | 1471633 B | | 2/2015 | |
| TW | 201614307 A | | 4/2016 | |
| TW | 1629503 B | | 7/2018 | |
| TW | 1637211 B | | 10/2018 | |
| TW | I659239 B | | 5/2019 | |
| WO | WO 2012/077338 A1 | | 6/2012 | |

OTHER PUBLICATIONS

Chinese Office Action dated Sep. 14, 2022, in counterpart Chinese Patent Application No. 20201090024.3 (6 pages in English and 7 pages in Chinese).

Taiwanese Office Action dated Jul. 5, 2022, in counterpart Taiwanese Patent Application No. 110141136 (7 pages in English and 8 pages in Chinese).

Chinese Office Action dated Feb. 18, 2021, in counterpart Chinese Application No. 202021868489.1 (2 pages in English and 2 pages in Chinese).

Taiwanese Notice of Allowance dated Aug. 4, 2021, in counterpart Taiwanese Patent Application No. 109129614 (1 page in English (partial English translation) and 3 pages in Chinese).

Taiwanese Office Action issued on Dec. 4, 2023, in counterpart Taiwanese Patent Application No. 112103507 (4 pages in English, 4 pages in Chinese).

Chinese Office Action issued on Feb. 24, 2024, in counterpart Chinese Patent Application No. 202210511013.X (3 pages in English, 7 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2019-0107669 filed on Aug. 30, 2019, in the Korean Intellectual Property Office, the entire disclosure of which is incorporated herein by reference for all purposes.

BACKGROUND

1. Field

This application relates to an optical imaging system configured to fold an optical path.

2. Description of Related Art

In an optical system in which a plurality of lenses are disposed along an optical axis, the total length of the optical system generally increases as the number of lenses increases. For example, an optical imaging system including five lenses is more difficult to miniaturize than an optical imaging system including three lenses. For this reason, it may not be possible to mount a telephoto optical system having a long focal length in a thin portable electronic device.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens sequentially disposed in ascending numerical order along an optical axis from an object-side surface of the first lens toward an imaging plane of the optical imaging system, wherein the conditional expression $11 \leq TTL/IMG\_HT$ is satisfied, where TTL is a distance along the optical axis from the object-side surface of the first lens to the imaging plane, and IMG_HT is one-half of a diagonal length of the imaging plane.

The optical imaging system may further include a first prism disposed between an object side of the optical imaging system and the object-side surface of the first lens, wherein the first prism may include a reflective surface configured to receive incident light from an object and reflect the incident light toward the first lens.

The conditional expression $8.0 \text{ mm} < DPL1 < 12.0 \text{ mm}$ may be satisfied, where DPL1 is a distance in millimeters (mm) along the optical axis from an image-side surface of the first prism to the object-side surface of the first lens.

The first prism may include a reflective surface, and the conditional expression $40 \text{ mm} < PTTL < 70 \text{ mm}$ may be satisfied, where PTTL is a distance in millimeters (mm) along the optical axis from the reflective surface of the first prism to the imaging plane.

The first lens may have a positive refractive power.
The second lens may have a negative refractive power.
The fourth lens may have a convex image-side surface.

The optical imaging system may further include a sixth lens disposed between the fifth lens and the imaging plane.

The sixth lens may have a concave object-side surface.

The optical imaging system may further include a second prism disposed in an optical path between the fifth lens and the imaging plane, wherein the second reflective member may include a reflective surface configured to receive light from the fifth lens and reflect the light toward the image sensor.

The first lens may have a positive refractive power, the object-side surface of the first lens may be convex, and the fourth lens may have a convex image-side surface.

A portable electronic device may include a first camera module including the optical imaging system of the one general aspect described above; a second camera module; and a third camera module, wherein the image sensor of the first camera module is configured to convert light incident onto the image sensor through the first to fifth lenses of the first camera module into an electrical signal, the optical axis of the first camera module is oriented in a first direction, and an optical axis of the second camera module and an optical axis of the third camera module are oriented in a second direction different from the first direction.

The first camera module may have a first angle of view and a first focal length, the second camera module may have a second angle of view wider than the first angle of view and a second focal length shorter than the first focal length, and the third camera module may have a third angle of view wider than the second angle of view and a third focal length shorter than the second focal length.

In another general aspect, an optical imaging system includes a first lens, a second lens, a third lens, a fourth lens, and a fifth lens sequentially disposed in ascending numerical order along an optical axis from an object-side surface of the first lens toward an imaging plane of the optical imaging system, wherein the first lens has a non-circular shape when viewed in a direction of the optical axis, an image-side surface of the first lens has an effective radius that varies from a minimum effective radius that is a short axis effective radius L1S2es in a first direction perpendicular to the optical axis to a maximum effective radius that is a long axis effective radius L1S2el in a second direction perpendicular to the first direction and perpendicular to the optical axis, and the conditional expression $0.80 < L1S2es/L1S2el < 1.0$ is satisfied.

The conditional expression $0 \leq D12/f \leq 0.05$ may be satisfied, where D12 is a distance along the optical axis from the image-side surface of the first lens to an object-side surface of the second lens, and f is a focal length of the optical imaging system.

The conditional expression $0.5 < L1S2eMax/IMG\_HT < 2.20$ may be satisfied, where L1S2eMax is the maximum effective radius of the image-side surface of the first lens and is equal to L1S2el, and IMG_HT is one-half of a diagonal length of the imaging plane.

The conditional expression $11 \leq TTL/IMG\_HT$ may be satisfied, where TTL is a distance along the optical axis from the object-side surface of the first lens to the imaging plane, and IMG_HT is one-half of a diagonal length of the imaging plane.

The optical imaging system may further include a first prism disposed between an object side of the optical imaging system and the object-side surface of the first lens, wherein the first prism may include a reflective surface configured to receive incident light from an object and reflect the incident light toward the first lens.

The first lens may have a non-circular shape when viewed in a direction of the optical axis, the object-side surface of the first lens may have an effective radius that varies from a minimum effective radius that is a short axis effective radius L1S1es in a first direction perpendicular to the optical axis to a maximum effective radius that is a long axis effective radius L1S1el in a second direction perpendicular to the first direction and perpendicular to the optical axis, and the conditional expression 0.07<L1S1es/PTTL<0.12 may be satisfied, where PTTL is a distance along the optical axis from the reflective surface of the first prism to the imaging plane.

The optical imaging system may further include a second prism disposed in an optical path between the fifth lens and the imaging plane, wherein the second reflective member includes a reflective surface configured to receive light from the fifth lens and reflect the light toward the image sensor.

The first lens may have a positive refractive power, the object-side surface of the first lens may be convex, and the fourth lens may have a convex image-side surface.

A portable electronic device may include a first camera module including the optical imaging system of the other general aspect described above; a second camera module; and a third camera module, wherein the image sensor of the first camera module may be configured to convert light incident onto the image sensor through the first to fifth lenses of the first camera module into an electrical signal, the optical axis of the first camera module may be oriented in a first direction, and an optical axis of the second camera module and an optical axis of the third camera module may be oriented in a second direction different from the first direction.

The first camera module may have a first angle of view and a first focal length, the second camera module may have a second angle of view wider than the first angle of view and a second focal length shorter than the first focal length, and the third camera module may have a third angle of view wider than the second angle of view and a third focal length shorter than the second focal length.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
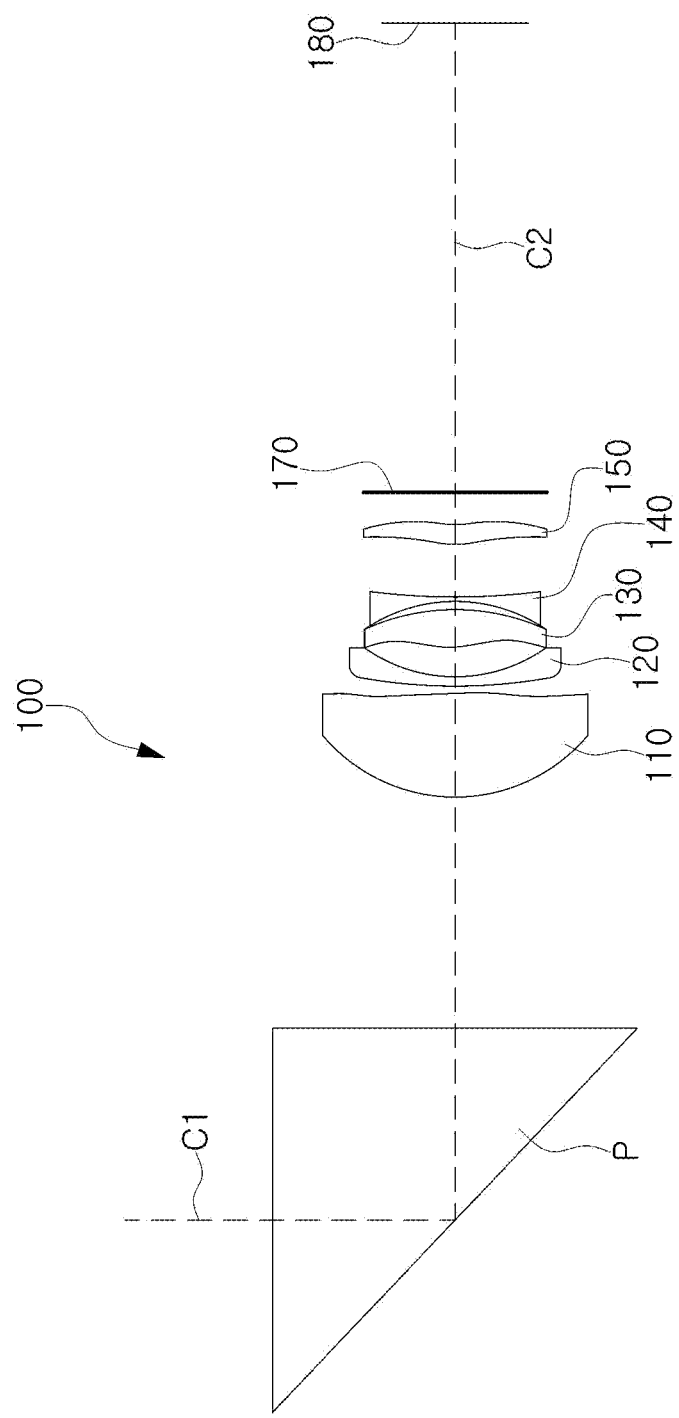
FIG. 1 is a configuration diagram of a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various elements, these elements are not to be limited by these terms. Rather, these terms are only used to distinguish one element from another element. Thus, a first element referred to in examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

A first lens is a lens closest to an object (or a subject), and a fifth lens, or a sixth lens if there is one, is a lens closest to an imaging plane (or an image sensor).

Radiuses of curvature, thickness of lenses and other elements, distances between the lenses and the other elements, focal lengths, PTTL, TTL, BFL, IMG_HT, 2IMG_HT, L1R1eMax, L1R2eMax, L1S1el, L1S1es, L1S2el, L1S2es, L2S1el, L2S1es, L2S2el, and L2S2es are expressed in millimeters (mm). These quantities are defined later in this application.

The thicknesses of the lenses and other elements, the distances between the lenses and the other elements, PTTL, TTL, and BFL are measured along the optical axis of the optical imaging system.

Unless stated otherwise, a reference to the shape of a lens surface means the shape of a paraxial region of the lens surface. A paraxial region of a lens surface is a central portion of the lens surface surrounding the optical axis of the lens surface in which light rays incident to the lens surface make a small angle θ to the optical axis, and the approximations $\sin\theta \approx \theta$, $\tan\theta \approx \theta$, and $\cos\theta \approx 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

An optical imaging system includes an optical system including a plurality of lenses. For example, the optical system of the optical imaging system includes a plurality of lenses each having a refractive power. However, the optical imaging system is not limited only to lenses having a refractive power. For example, the optical imaging system may include a prism for reflecting incident light, and a stop for adjusting an amount of the incident light. In addition, the optical imaging system may include an infrared blocking filter for blocking infrared light. In addition, the optical imaging system may further include an image sensor (for example, an imaging device) for converting an image of a subject incident through the optical system into an electrical signal. In addition, the optical imaging system may further include a gap maintaining member for maintaining a spacing between two lenses.

The lenses are made of a material having a refractive index different from a refractive index of air. For example, the plurality of lenses are made of plastic or glass.

At least one surface of at least one of the lenses may have an aspherical shape. The aspherical surface of the lens is expressed by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \tag{1}$$

In Equation 1, c is a curvature of a lens surface and is a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A to H and J are aspherical constants, and Z (also known as sag) is a distance in a direction parallel to the optical axis of the lens surface from the point on the lens surface at the distance r from the optical axis of the lens surface to a tangential plane perpendicular to the optical axis and intersecting a vertex of the lens surface.

The optical imaging system includes five or more lenses. For example, the optical imaging system includes a first lens closest to the object, a second lens, a third lens, a fourth lens, and a fifth lens closest to the imaging plane that are sequentially disposed in ascending numerical order from the first lens to the fifth lens. Alternatively, the optical imaging system includes a first lens closest to the object, a second lens, a third lens, a fourth lens, a fifth lens, and a sixth lens closest to the imaging plane that are sequentially disposed in ascending numerical order from the first lens to the sixth lens.

Each of the first to fifth or sixth lenses may be spaced apart from each other. For example, an image-side surface of the first lens does not contact an object-side surface of the second lens, and an image-side surface of the second lens does not contact an object-side surface of the third lens.

The first lens has a predetermined refractive power. For example, the first lens may have a positive refractive power. The first lens has a convex surface. For example, the first lens may have a convex object-side surface. The first lens has a predetermined refractive index. For example, the first lens may have a refractive index of less than 1.6. The first lens has a predetermined focal length. For example, the focal length of the first lens may be determined in a range of 7.0 to 18.0 mm.

The second lens has a predetermined refractive power. For example, the second lens may have a positive refractive power or a negative refractive power. The second lens has a concave surface. For example, the second lens may have either one or both of a concave object-side surface and a concave image-side surface. Alternatively, if there are six lenses, the second lens has a convex surface. For example, the second lens may have a convex object-side surface and a convex image-side surface. The second lens has a predetermined refractive index. For example, the second lens may have a refractive index of 1.6 or more and less than 1.8. Alternatively, if there are six lenses, the second lens may have a refractive index of 1.5 or more and less than 1.8.

The third lens has a predetermined refractive power. For example, the third lens may have a positive refractive power or a negative refractive power. The third lens has a convex surface. For example, the third lens may have a convex object-side surface or a convex image-side surface. The third lens has a predetermined refractive index. For example, the third lens may have a refractive index of 1.6 or more and 2.0 or less.

The fourth lens has a predetermined refractive power. For example, the fourth lens may have a positive refractive power or a negative refractive power. The fourth lens has a convex surface. For example, the fourth lens may have a convex image-side surface. The fourth lens has a predetermined refractive index. For example, the fourth lens may have a refractive index of 1.6 or more and less than 1.8.

The fifth lens has a predetermined refractive power. For example, the fifth lens may have a positive refractive power or a negative refractive power. The fifth lens has a concave surface. For example, the fifth lens may have a concave object-side surface or a concave image-side surface. The fifth lens has a predetermined refractive index. For example, the fifth lens may have a refractive index of 1.5 or more and less than 1.8.

The sixth lens has a predetermined refractive power. For example, the sixth lens may have a positive refractive power. The sixth lens has a convex surface. For example, the sixth lens may have a convex image-side surface. The sixth lens has a predetermined refractive index. For example, the sixth lens may have a refractive index of 1.6 or less.

One or more of the first to sixth lenses may have a shape in which an effective radius or diameter of the lens in a first direction intersecting the optical axis is different from an effective radius or diameter of the lens in a second direction intersecting the optical axis and perpendicular to the first direction.

The optical imaging system may include a lens made of plastic. For example, at least one of the five or six lenses of the optical imaging system may be made of a plastic material.

The optical imaging system may include an aspherical lens. For example, at least one of the five or six lenses of the optical imaging system may be an aspherical lens.

The optical imaging system may include an optical element configured to fold an optical path in the optical imaging system. For example, the optical imaging system may include a prism configured to reflect light. The prism may be disposed on an object side of the first lens. The prism may be made of a material having a relatively low Abbe number. For example, the prism may be made of a material having an Abbe number of 60 or less.

The optical imaging system includes a filter and an image sensor, and may include an aperture stop.

The filter is disposed between the image sensor and a lens disposed closest to the imaging sensor. The filter blocks a range of wavelengths of incident light to improve the resolution of the optical imaging system. For example, the filter may block infrared wavelengths of incident light.

The optical imaging system includes a gap maintaining member.

The gap maintaining member is disposed between two lenses to maintain a spacing between the two lenses. For example, the gap maintaining member may be disposed between the first lens and the second lens. A hole is formed in the gap maintaining member. The hole may have a shape having a long axis and a short axis. For example, the hole may have the shape of an ellipse, a rectangle with rounded corners, or any other shape that has a long axis and a short axis. A length of the hole in a short axis direction may be 0.8 or more and less than 1.0 times a length of the hole in a long axis direction.

The optical imaging system may satisfy any one or any two or more of the following Conditional Expressions 1 to 9.

| | |
|---|---|
| $2.8 \leq f\text{-number}$ | (Conditional Expression 1) |
| $3.2 < Nd2 + Nd3$ | (Conditional Expression 2) |
| $0 \text{ mm} < f1 + f2 < 32 \text{ mm}$ | (Conditional Expression 3) |
| $0 \leq D12/f \leq 0.05$ | (Conditional Expression 4) |
| $0.5 < L1R2e\text{Max}/IMG\_HT < 2.2$ | (Conditional Expression 5) |
| $0.8 < L1R2e\text{Max}/L1R1e\text{Max} < 1.0$ | (Conditional Expression 6) |
| $0.8 \leq TTL/f \leq 1.0$ | (Conditional Expression 7) |
| $11 \leq TTL/IMG\_HT$ | (Conditional Expression 8) |
| $0.2 \leq L1R1/f \leq 0.3$ | (Conditional Expression 9) |

In the above Conditional Expressions 1 to 9, f-number is an f-number of the optical imaging system, and is equal to a focal length f of the optical imaging system divided by an entrance pupil diameter of the optical imaging system, Nd2 is the refractive index of the second lens, Nd3 is the refractive index of the third lens, f1 is the focal length of the first lens, f2 is the focal length of the second lens, D12 is a distance along the optical axis from the image-side surface of the first lens to the object-side surface of the second lens, f is the focal length of the optical imaging system, L1R1eMax is a maximum effective radius of the object-side surface of the first lens, L1R2eMax is a maximum effective radius of the image-side surface of the first lens, TTL is a distance along the optical axis from the object-side surface of the first lens to the imaging plane, IMG_HT is one-half of a diagonal length of the imaging plane, and L1R1 is a radius of curvature of the object-side surface of the first lens.

Additionally, the optical imaging system may further satisfy any one or any two or more of the following Conditional Expressions 10 to 25.

| | |
|---|---|
| $0.65 < L1S1es/L1S1el < 1.0$ | (Conditional Expression 10) |
| $0.80 < L1S2es/L1S2el < 1.0$ | (Conditional Expression 11) |
| $0.85 < L2S1es/L2S1el < 1.0$ | (Conditional Expression 12) |
| $0.65 < L2S2es/L2S2el < 1.0$ | (Conditional Expression 13) |
| $8.0 \text{ mm} < DPL1 < 12.0 \text{ mm}$ | (Conditional Expression 14) |
| $40 \text{ mm} < PTTL < 70 \text{ mm}$ | (Conditional Expression 15) |
| $0.8 < SPY2/SPX2 < 1.0$ | (Conditional Expression 16) |
| $1.5 < L1S1el/IMG\_HT < 2.2$ | (Conditional Expression 17) |
| $0.09 < L1S1el/PTTL < 0.13$ | (Conditional Expression 18) |
| $0.07 < L1S1es/PTTL < 0.12$ | (Conditional Expression 19) |
| $0.06 < L2S1el/PTTL < 0.11$ | (Conditional Expression 20) |
| $0.06 < L2S1es/PTTL < 0.10$ | (Conditional Expression 21) |
| $0.02 < AL1/(PTTL)^2 < 0.05$ | (Conditional Expression 22) |
| $10° < 2\theta < 92°$ | (Conditional Expression 23) |
| $1.0 < 2\theta/FOV < 10$ | (Conditional Expression 24) |
| $2 < BFL/2IMG\_HT < 5$ | (Conditional Expression 25) |

In the above Conditional Expressions 10 to 25, L1S1es is a short axis effective radius of the object-side surface of the first lens, L1S1el is a long axis effective radius of the object-side surface of the first lens (and is the same as L1R1eMax in Conditional Expression 6), L1S2es is a short axis effective radius of the image-side surface of the first lens, L1S2el is a long axis effective radius of the image-side surface of the first lens (and is the same as L1R2eMax in Conditional Expressions 5 and 6), L2S1es is a short axis effective radius of the object-side surface of the second lens, L2S1el is a long axis effective radius of the object-side surface of the second lens, L2S2es is a short axis effective radius of the image-side surface of the second lens, and L2S2el is a long axis effective radius of the image-side surface of the second lens.

DPL1 is a distance along the optical axis from an image-side surface of the prism on the object side of the first lens to the object-side surface of the first lens, and PTTL is a distance along the optical axis from a reflective surface of the prism on the object side of the first lens to the imaging plane.

SPY2 is a length in a short axis direction of the hole of the gap maintaining member, and SPX2 is a length in a long axis direction of the hole of the gap maintaining member.

IMG_HT is one-half of the diagonal length of the imaging plane.

AL1 is an area of an object-side surface of an optical portion of the first lens projected in an optical axis direction onto a plane perpendicular to the optical axis direction. The optical portion of the object-side surface of the first lens is a portion of the object-side surface that exhibits a lens characteristic of the first lens. The first lens has a non-circular shape when viewed in the optical axis direction, and includes two arc-shaped side surfaces and two straight-shaped side surfaces connecting the two arc-shaped side surfaces to each other. $2\theta$ is an angle having a vertex on the optical axis of the first lens and subtended by one of the straight-shaped side surfaces.

FOV is a total angle or field of view of the optical imaging system, BFL is a distance along the optical axis from an image-side surface of the lens closest to the imaging plane (i.e., the fifth lens or the sixth lens) to the imaging plane, and 2IMG_HT is the diagonal length of the imaging plane.

Next, first to eleventh examples of an optical imaging system will be described.

Figure 2:
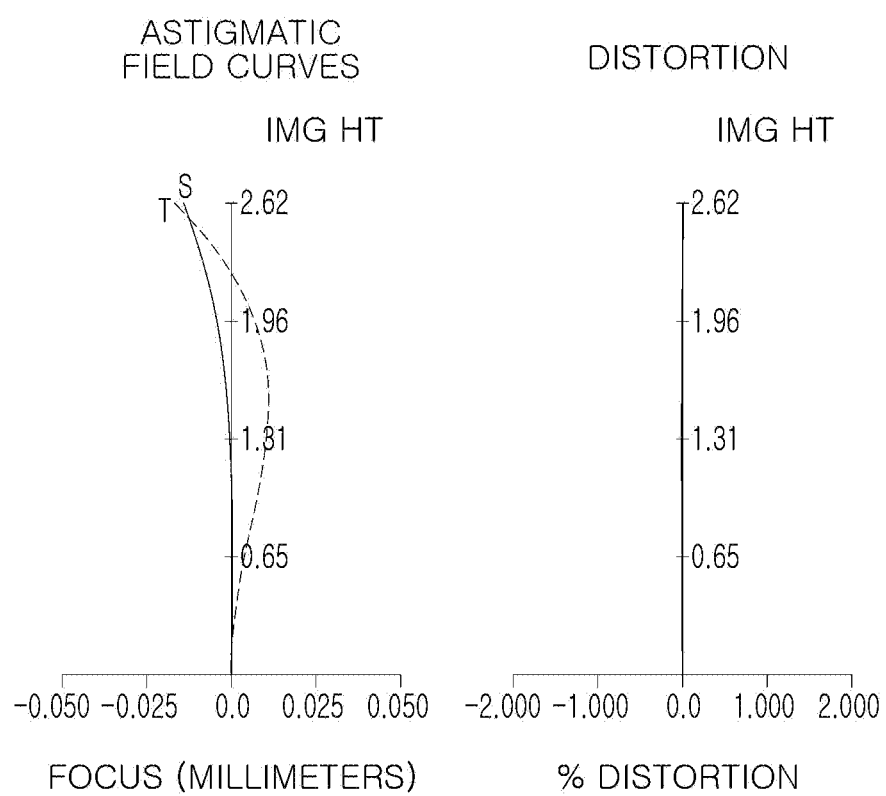
FIG. 2 shows aberration curves of the optical imaging system illustrated in FIG. 1.

FIG. 1 is a configuration diagram of a first example of an optical imaging system, and FIG. 2 shows aberration curves of the optical imaging system illustrated in FIG. 1.

An optical imaging system 100 includes a first lens 110, a second lens 120, a third lens 130, a fourth lens 140, and a fifth lens 150.

The first lens 110 has a positive refractive power. The first lens 110 has a convex object-side surface and a convex image-side surface. The second lens 120 has a negative refractive power. The second lens 120 has a convex object-side surface and a concave image-side surface. The third lens 130 has a positive refractive power. The third lens 130 has a convex object-side surface and a convex image-side surface. The fourth lens 140 has a negative refractive power. The fourth lens 140 has a concave object-side surface and a convex image-side surface. The fifth lens 150 has a positive refractive power. The fifth lens 150 has a convex object-side surface and a concave image-side surface.

The optical imaging system 100 includes a prism P, a filter 170, and an image sensor 180.

The optical imaging system 100 includes the prism P as a means for folding an optical path of light in the optical imaging system 100. The prism P folds a first optical axis C1 to form a second optical axis C2. The second optical axis C2 is substantially perpendicular to the first optical axis C1. The prism P is disposed on the object side of the first lens 110, and reflects light reflected from an object (a subject) to the image sensor 180.

The filter 170 is disposed in front of the image sensor 180, and blocks infrared rays included in incident light. The image sensor 180 includes a plurality of optical sensors, and is configured to convert an optical signal into an electrical signal.

Table 1 below illustrates optical characteristics of the elements of the optical imaging system 100, and Table 2 below illustrates aspherical surface coefficients of the lenses of the optical imaging system 100.

TABLE 1

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 6.000 | 1.519 | 64.2 | | |
| 2 | | Infinity | 6.000 | 1.519 | 64.2 | | |
| 3 | | Infinity | 9.000 | | | | |
| 4 | First | 6.72 | 4.000 | 1.537 | 55.7 | 5.380 | 4.909 |
| 5 | Lens | −57.85 | 0.393 | | | 4.748 | 4.401 |
| 6 | Second | 13.11 | 0.300 | 1.621 | 26.0 | 4.379 | 4.158 |
| 7 | Lens | 3.96 | 1.237 | | | 3.822 | 3.708 |
| 8 | Third | 10.57 | 1.317 | 1.680 | 19.2 | 3.705 | 3.653 |
| 9 | Lens | −62.18 | 0.356 | | | 3.673 | 3.628 |
| 10 | Fourth | −5.15 | 0.303 | 1.642 | 23.9 | 3.595 | 3.595 |
| 11 | Lens | −25.18 | 2.028 | | | 3.562 | 3.505 |
| 12 | Fifth | 6.60 | 0.817 | 1.571 | 37.4 | 3.667 | 3.590 |
| 13 | Lens | 17.00 | 1.020 | | | 3.707 | 3.616 |
| 14 | Filter | Infinity | 0.110 | 1.519 | 64.2 | 3.648 | |
| 15 | | Infinity | 18.304 | | | 3.645 | |
| 16 | Imaging Plane | Infinity | 0.000 | | | | |

TABLE 2

| Surface Number | k | A | B | C | D | E | F | G | H | J |
|---|---|---|---|---|---|---|---|---|---|---|
| 4 | −9.4E−01 | 2.7E−04 | 3.2E−05 | −7.2E−06 | 7.3E−07 | −2.3E−08 | −1.2E−09 | 1.2E−10 | −3.6E−12 | 3.7E−14 |
| 5 | 0.0E+00 | 2.9E−03 | −1.4E−03 | 2.8E−04 | −3.1E−05 | 1.9E−06 | −7.0E−08 | 1.4E−09 | −1.3E−11 | 4.6E−14 |
| 6 | 0.0E+00 | −6.3E−03 | 5.2E−04 | 1.8E−05 | −9.6E−06 | 1.1E−06 | −7.4E−08 | 3.3E−09 | −9.6E−11 | 1.3E−12 |
| 7 | 0.0E+00 | −1.4E−02 | 3.0E−03 | −5.0E−04 | 3.6E−05 | 1.1E−06 | −4.3E−07 | 3.5E−08 | −1.2E−09 | 1.5E−11 |
| 8 | 0.0E+00 | −7.5E−03 | 6.7E−04 | 5.6E−05 | −2.8E−05 | 4.8E−06 | −5.3E−07 | 4.1E−08 | −1.9E−09 | 4.0E−11 |
| 9 | 0.0E+00 | −5.2E−03 | −2.3E−03 | 1.5E−03 | −3.8E−04 | 5.3E−05 | −4.4E−06 | 2.1E−07 | −4.8E−09 | 4.0E−11 |
| 10 | 0.0E+00 | 3.0E−03 | 1.2E−03 | −4.3E−04 | 1.0E−04 | −1.8E−05 | 2.3E−06 | −1.8E−07 | 7.7E−09 | −1.4E−10 |
| 11 | 0.0E+00 | −4.7E−03 | 4.8E−03 | −2.1E−03 | 5.3E−04 | −8.3E−05 | 8.1E−06 | −4.9E−07 | 1.7E−08 | −2.4E−10 |
| 12 | 0.0E+00 | −1.1E−02 | 5.1E−04 | −1.1E−04 | 6.4E−05 | −1.4E−05 | 1.5E−06 | −1.0E−07 | 3.8E−09 | −6.2E−01 |
| 13 | 0.0E+00 | −6.8E−03 | −1.2E−04 | 1.2E−04 | −1.2E−05 | 3.8E−07 | 1.1E−08 | −1.7E−09 | 1.1E−10 | −3.5E−12 |

Figure 3:
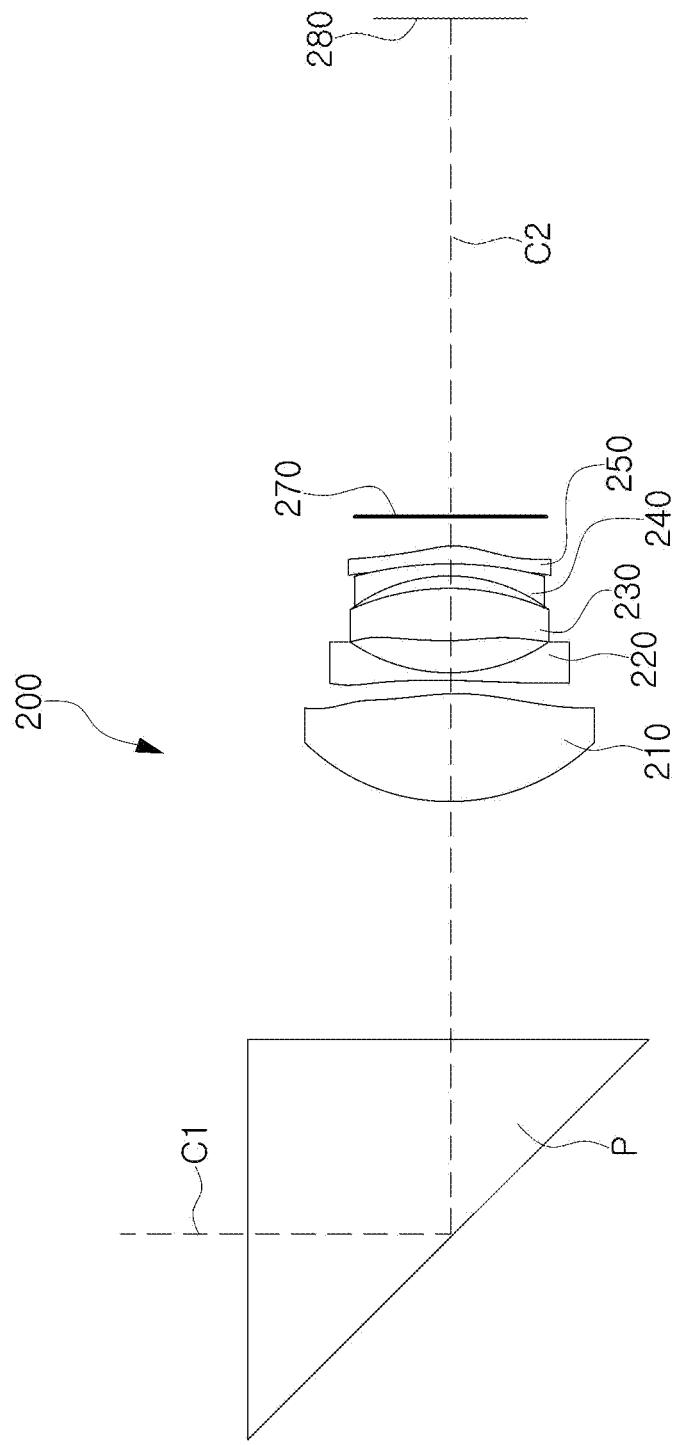
FIG. 3 is a configuration diagram of a second example of an optical imaging system.
Figure 4:
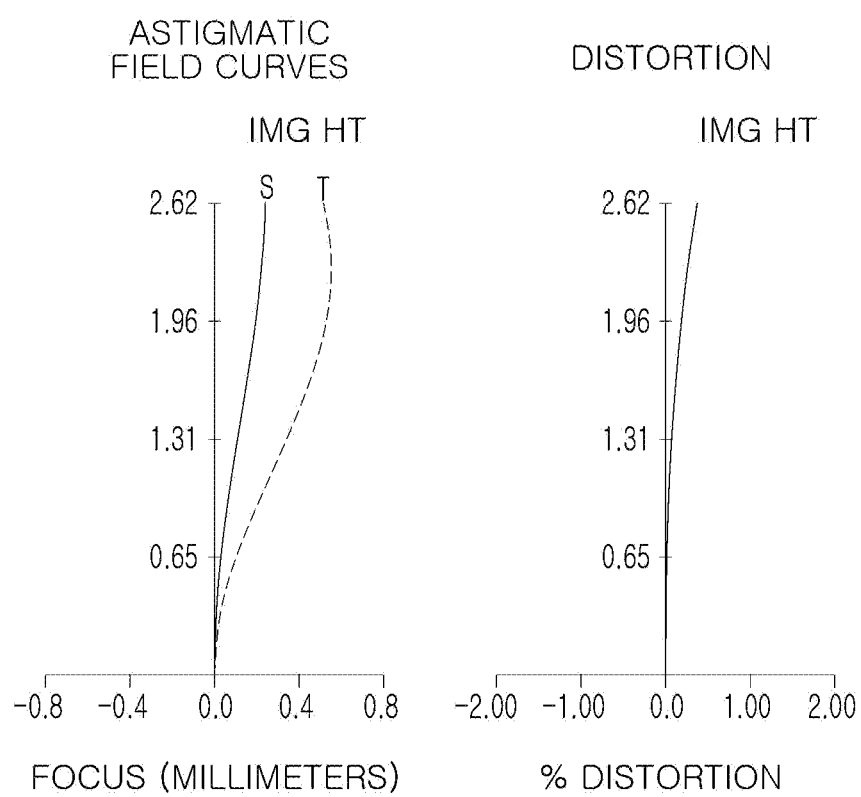
FIG. 4 shows aberration curves of the optical imaging system illustrated in FIG. 3.

FIG. 3 is a configuration diagram of a second example of an optical imaging system, and FIG. 4 shows aberration curves of the optical imaging system illustrated in FIG. 3.

An optical imaging system 200 includes a first lens 210, a second lens 220, a third lens 230, a fourth lens 240, and a fifth lens 250.

The first lens 210 has a positive refractive power. The first lens 210 has a convex object-side surface and a convex image-side surface. The second lens 220 has a negative refractive power. The second lens 220 has a convex object-side surface and a concave image-side surface. The third lens 230 has a positive refractive power. The third lens 230 has a convex object-side surface and a convex image-side surface. The fourth lens 240 has a negative refractive power. The fourth lens 240 has a concave object-side surface and a convex image-side surface. The fifth lens 250 has a positive refractive power. The fifth lens 250 has a concave object-side surface and a convex image-side surface.

The optical imaging system 200 further includes a prism P, a filter 270, and an image sensor 280.

The optical imaging system 200 includes the prism P as a means for folding an optical path of light in the optical imaging system 200. The prism P folds a first optical axis C1 to form a second optical axis C2. The second optical axis C2 is substantially perpendicular to the first optical axis C1. The prism P is disposed on the object side of the first lens 210, and reflects light reflected from an object (a subject) to the image sensor 280.

The filter 270 is disposed in front of the image sensor 280, and blocks infrared rays included in incident light. The image sensor 280 includes a plurality of optical sensors, and is configured to convert an optical signal into an electrical signal.

Table 3 below illustrates optical characteristics of the optical imaging system 200, and Table 4 below illustrates aspherical surface coefficients of the lenses of the optical imaging system 200.

TABLE 3

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 6.000 | 1.519 | 64.2 | | |
| 2 | | Infinity | 6.000 | 1.519 | 64.2 | | |
| 3 | | Infinity | 9.000 | | | | |
| 4 | First | 7.08 | 4.012 | 1.537 | 55.7 | 5.380 | 4.763 |

TABLE 3-continued

| Surface Number | Element | Radius of Curvature | Thickness/ Distance | Refractive Index | Abbe Number | Long Axis Effective Radius | Short Axis Effective Radius |
|---|---|---|---|---|---|---|---|
| 5 | Lens | −16.42 | 0.444 | | | 4.748 | 4.341 |
| 6 | Second | 25.05 | 0.300 | 1.621 | 26.0 | 4.379 | 3.991 |
| 7 | Lens | 3.98 | 1.323 | | | 3.822 | 3.563 |
| 8 | Third | 11.83 | 1.945 | 1.680 | 19.2 | 3.705 | 3.527 |
| 9 | Lens | −25.38 | 0.470 | | | 3.673 | 3.586 |
| 10 | Fourth | −4.56 | 0.335 | 1.642 | 23.9 | 3.595 | 3.557 |
| 11 | Lens | −11.87 | 0.095 | | | 3.562 | 3.590 |
| 12 | Fifth | −6.69 | 0.700 | 1.571 | 37.4 | 3.707 | 3.581 |
| 13 | Lens | −4.87 | 1.020 | | | 3.667 | 3.562 |
| 14 | Filter | Infinity | 0.110 | 1.519 | 64.2 | 3.470 | |
| 15 | | Infinity | 18.696 | | | 3.465 | |
| 16 | Imaging Plane | Infinity | 0.000 | | | | |

TABLE 4

| Surface Number | k | A | B | C | D | E | F | G | H | J |
|---|---|---|---|---|---|---|---|---|---|---|
| 4 | −1.1E+00 | 9.1E−05 | 4.1E−05 | −1.3E−05 | 2.3E−06 | −2.2E−07 | 1.2E−08 | −4.0E−10 | 7.0E−12 | −5.1E−14 |
| 5 | 0.0E+00 | 2.5E−03 | −1.6E−03 | 4.3E−04 | −6.4E−05 | 5.7E−06 | −3.2E−07 | 1.1E−08 | −2.0E−10 | 1.6E−12 |
| 6 | 0.0E+00 | −2.9E−03 | −2.2E−03 | 1.0E−03 | −2.1E−04 | 2.4E−05 | −1.7E−06 | 6.9E−08 | −1.6E−09 | 1.6E−11 |
| 7 | 0.0E+00 | −8.4E−03 | −9.2E−04 | 9.1E−04 | −2.6E−04 | 4.2E−05 | −4.2E−06 | 2.6E−07 | −8.9E−09 | 1.3E−10 |
| 8 | 0.0E+00 | −5.7E−03 | −6.7E−04 | 6.5E−04 | −2.3E−04 | 4.7E−05 | −6.1E−06 | 4.6E−07 | −1.9E−08 | 3.3E−10 |
| 9 | 0.0E+00 | −5.2E−03 | −9.2E−04 | 5.3E−04 | −1.2E−04 | 1.8E−05 | −2.0E−06 | 1.5E−07 | −6.1E−09 | 1.0E−10 |
| 10 | 0.0E+00 | 3.0E−03 | −3.4E−04 | 8.0E−04 | −3.6E−04 | 8.0E−05 | −1.0E−05 | 7.5E−07 | −2.9E−08 | 4.8E−10 |
| 11 | 0.0E+00 | 4.5E−03 | −9.7E−03 | 6.4E−03 | −2.1E−03 | 3.9E−04 | −4.3E−05 | 2.9E−06 | −1.0E−07 | 1.6E−09 |
| 12 | 0.0E+00 | 1.7E−02 | −1.4E−02 | 7.5E−03 | −2.1E−03 | 3.7E−04 | −3.8E−05 | 2.4E−06 | −8.5E−08 | 1.3E−09 |
| 13 | 0.0E+00 | 1.2E−02 | −1.7E−03 | 3.1E−04 | 1.1E−05 | −1.7E−05 | 3.0E−06 | −2.4E−07 | 9.7E−09 | −1.5E−10 |

Figure 5:
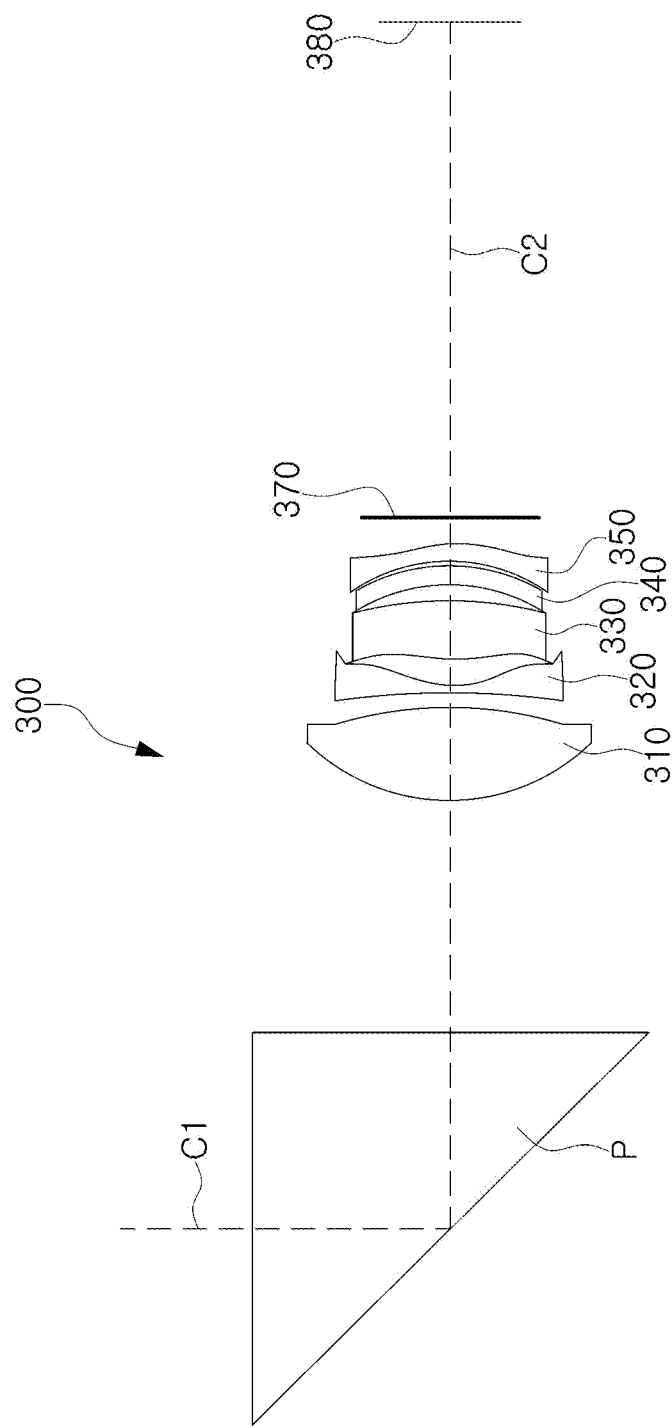
FIG. 5 is a configuration diagram of a third example of an optical imaging system.
Figure 6:
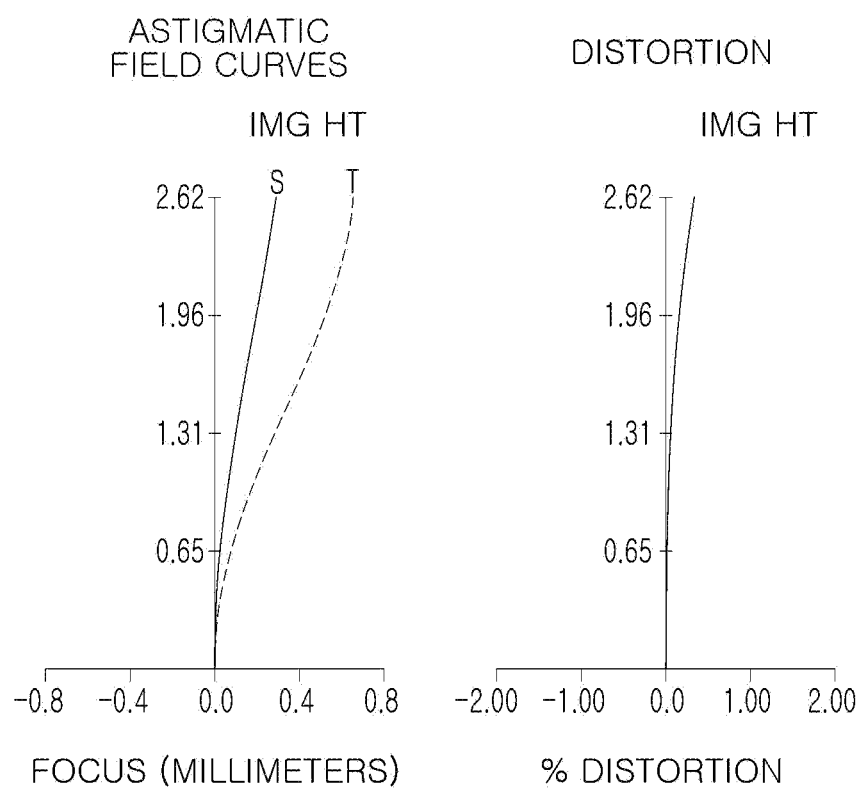
FIG. 6 shows aberration curves of the optical imaging system illustrated in FIG. 5.

FIG. 5 is a configuration diagram of a third example of an optical imaging system, and FIG. 6 shows aberration curves of the optical imaging system illustrated in FIG. 5.

An optical imaging system 300 includes a first lens 310, a second lens 320, a third lens 330, a fourth lens 340, and a fifth lens 350.

The first lens 310 has a positive refractive power. The first lens 310 has a convex object-side surface and a convex image-side surface. The second lens 320 has a negative refractive power. The second lens 320 has a convex object-side surface and a concave image-side surface. The third lens 330 has a positive refractive power. The third lens 330 has a convex object-side surface and a convex image-side surface. The fourth lens 340 has a negative refractive power. The fourth lens 340 has a concave object-side surface and a convex image-side surface. The fifth lens 350 has a negative refractive power. The fifth lens 350 has a concave object-side surface and a convex image-side surface.

The optical imaging system 300 further includes a prism P, a filter 370, and an image sensor 380.

The optical imaging system 300 includes the prism P as a means for folding an optical path of light in the optical imaging system 300. The prism P folds a first optical axis C1 to form a second optical axis C2. The second optical axis C2 is substantially perpendicular to the first optical axis C1. The prism P is disposed on the object side of the first lens 310, and reflects light reflected from an object (a subject) to the image sensor 380.

The filter 370 is disposed in front of the image sensor 380, and blocks infrared rays included in incident light. The image sensor 380 includes a plurality of optical sensors, and is configured to convert an optical signal into an electrical signal.

Table 5 below illustrates optical characteristics of the elements of the optical imaging system 300, and Table 6 below illustrates aspherical surface coefficients of the lenses of the optical imaging system 300.

TABLE 5

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 6.000 | 1.519 | 64.2 | | |
| 2 | | Infinity | 6.000 | 1.519 | 64.2 | | |
| 3 | | Infinity | 9.000 | | | | |
| 4 | First | 6.94 | 3.581 | 1.537 | 55.7 | 5.380 | 4.609 |
| 5 | Lens | −11.99 | 0.516 | | | 4.748 | 4.326 |
| 6 | Second | 81.24 | 0.350 | 1.621 | 26.0 | 4.379 | 3.879 |
| 7 | Lens | 4.14 | 0.998 | | | 3.822 | 3.516 |
| 8 | Third | 11.54 | 2.304 | 1.680 | 19.2 | 3.705 | 3.467 |
| 9 | Lens | −51.24 | 0.558 | | | 3.673 | 3.411 |

TABLE 5-continued

| Surface Number | Element | Radius of Curvature | Thickness/ Distance | Refractive Index | Abbe Number | Long Axis Effective Radius | Short Axis Effective Radius |
|---|---|---|---|---|---|---|---|
| 10 | Fourth | −4.73 | 0.600 | 1.642 | 23.9 | 3.595 | 3.376 |
| 11 | Lens | −6.66 | 0.163 | | | 3.562 | 3.366 |
| 12 | Fifth | −4.66 | 0.700 | 1.571 | 37.4 | 3.707 | 3.329 |
| 13 | Lens | −5.18 | 1.020 | | | 3.667 | 3.310 |
| 14 | Filter | Infinity | 0.110 | 1.519 | 64.2 | | |
| 15 | | Infinity | 19.009 | | | | |
| 16 | Imaging Plane | Infinity | 0.000 | | | | |

TABLE 6

| Surface Number | k | A | B | C | D | E | F | G | H | J |
|---|---|---|---|---|---|---|---|---|---|---|
| 4 | −1.2E+00 | −6.6E−05 | 4.5E−05 | −8.4E−06 | 1.3E−06 | −1.3E−07 | 7.7E−09 | −2.6E−10 | 4.5E−12 | −3.2E−14 |
| 5 | 0.0E+00 | 1.1E−03 | −5.8E−04 | 1.6E−04 | −2.3E−05 | 2.0E−06 | −1.1E−07 | 3.6E−09 | −6.7E−11 | 5.3E−13 |
| 6 | 0.0E+00 | −5.3E−03 | 6.6E−04 | −3.1E−05 | −1.2E−05 | 2.8E−06 | −2.7E−07 | 1.4E−08 | −3.7E−10 | 4.1E−12 |
| 7 | 0.0E+00 | −7.8E−03 | −2.3E−03 | 1.7E−03 | −5.1E−04 | 8.4E−05 | −8.2E−06 | 4.7E−07 | −1.5E−08 | 2.0E−10 |
| 8 | 0.0E+00 | −3.6E−04 | −7.6E−03 | 3.9E−03 | −1.0E−03 | 1.5E−04 | −1.4E−05 | 8.3E−07 | −2.6E−08 | 3.6E−10 |
| 9 | 0.0E+00 | 1.3E−03 | −9.1E−03 | 4.7E−03 | −1.3E−03 | 2.0E−04 | −2.0E−05 | 1.2E−06 | −4.2E−08 | 6.1E−10 |
| 10 | 0.0E+00 | 2.4E−03 | 3.1E−03 | −2.0E−03 | 6.6E−04 | −1.2E−04 | 1.3E−05 | −7.9E−07 | 2.7E−08 | −3.8E−10 |
| 11 | 0.0E+00 | −1.3E−02 | 1.4E−02 | −6.7E−03 | 1.9E−03 | −3.3E−04 | 3.6E−05 | −2.4E−06 | 8.7E−08 | −1.3E−09 |
| 12 | 0.0E+00 | 1.3E−02 | −8.1E−03 | 4.0E−03 | −1.1E−03 | 1.6E−04 | −1.3E−05 | 6.5E−07 | −1.5E−08 | 1.3E−10 |
| 13 | 0.0E+00 | 2.2E−02 | −1.3E−02 | 5.8E−03 | −1.6E−03 | 2.5E−04 | −2.5E−05 | 1.5E−06 | −5.2E−08 | 7.6E−10 |

Figure 7:
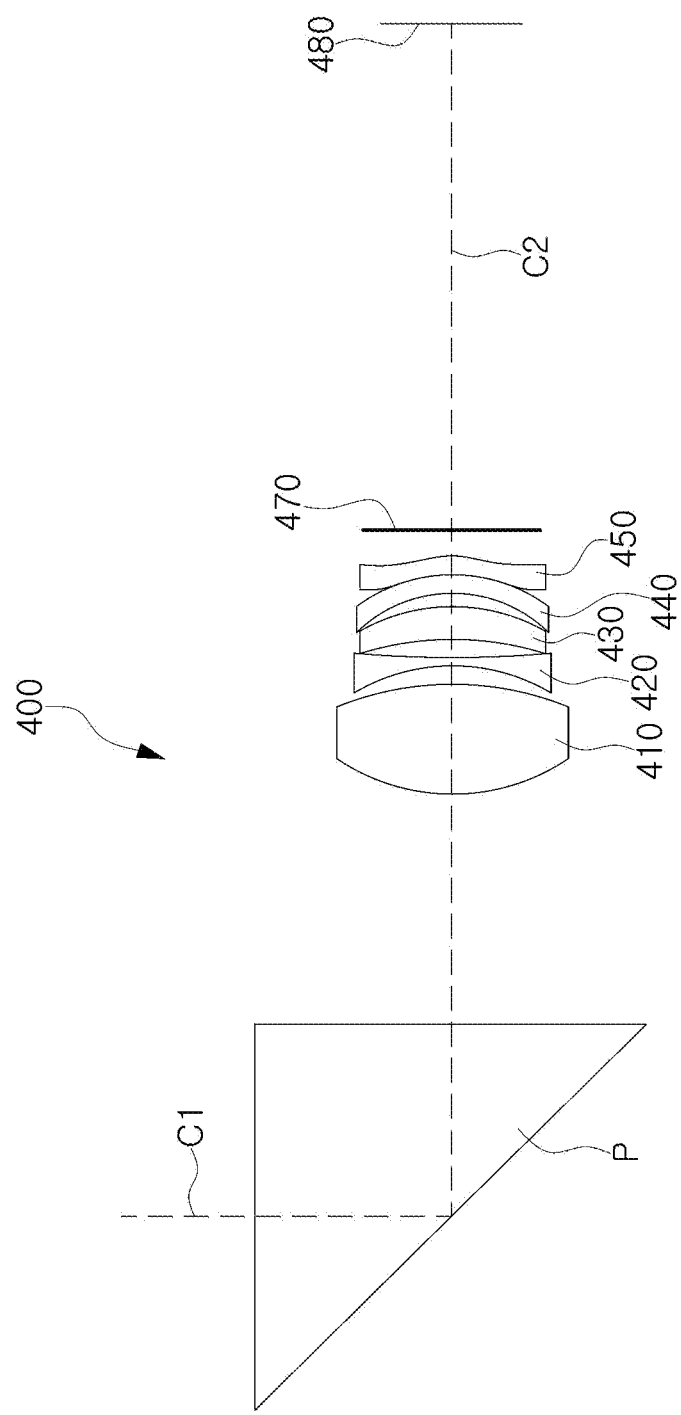
FIG. 7 is a configuration diagram of a fourth example of an optical imaging system.
Figure 8:
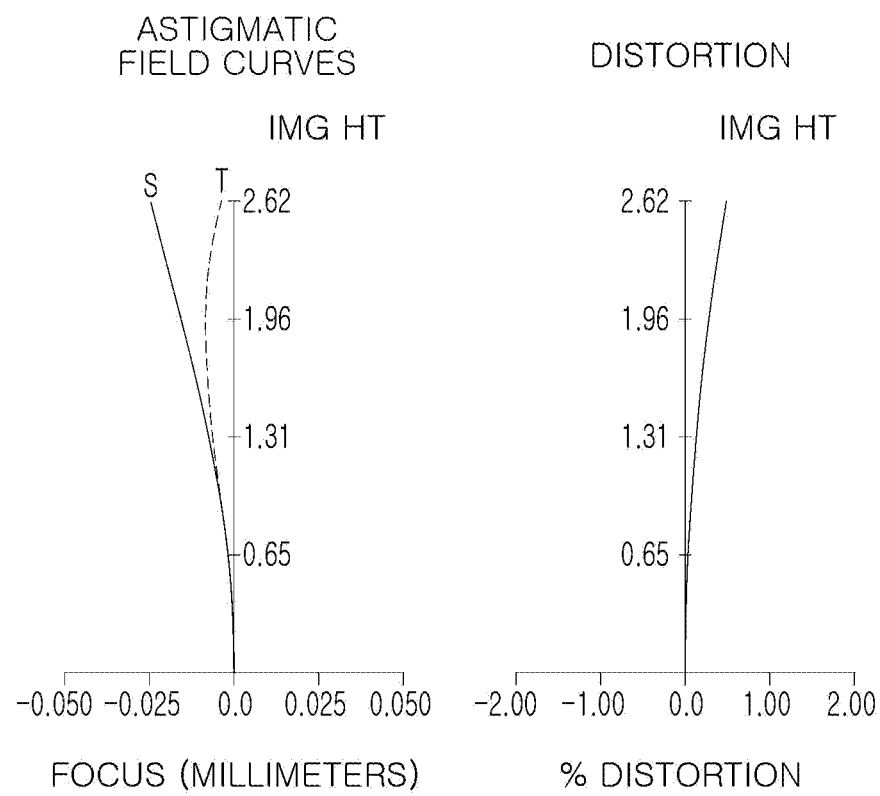
FIG. 8 shows aberration curves of the optical imaging system illustrated in FIG. 7.

FIG. 7 is a configuration diagram of a fourth example of an optical imaging system, and FIG. 8 shows aberration curves of the optical imaging system illustrated in FIG. 7.

An optical imaging system 400 includes a first lens 410, a second lens 420, a third lens 430, a fourth lens 440, and a fifth lens 450.

The first lens 410 has a positive refractive power. The first lens 410 has a convex object-side surface and a convex image-side surface. The second lens 420 has a negative refractive power. The second lens 420 has a concave object-side surface and a convex image-side surface. The third lens 430 has a positive refractive power. The third lens 430 has a convex object-side surface and a convex image-side surface. The fourth lens 440 has a negative refractive power. The fourth lens 440 has a concave object-side surface and a convex image-side surface. The fifth lens 450 has a negative refractive power. The fifth lens 450 has a concave object-side surface and a convex image-side surface.

The optical imaging system 400 includes a prism P, a filter 470, and an image sensor 480.

The optical imaging system 400 includes the prism P as a means for folding an optical path of light in the optical imaging system 400. The prism P folds a first optical axis C1 to form a second optical axis C2. The second optical axis C2 is substantially perpendicular to the first optical axis C1. The prism P is disposed on the object side of the first lens 410, and reflects light reflected from an object (a subject) to the image sensor 480.

The filter 470 is disposed in front of the image sensor 480, and blocks infrared rays included in incident light. The image sensor 480 includes a plurality of optical sensors, and is configured to convert an optical signal into an electrical signal.

Table 7 below illustrates optical characteristics of the elements of the optical imaging system 400, and Table 8 below illustrates aspherical surface coefficients of the lenses of the optical imaging system 400.

TABLE 7

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 6.000 | 1.519 | 64.2 | | |
| 2 | | Infinity | 6.000 | 1.519 | 64.2 | | |
| 3 | | Infinity | 9.000 | | | | |
| 4 | First | 7.85 | 4.250 | 1.537 | 55.7 | 4.400 | 4.377 |
| 5 | Lens | 9.42 | 0.648 | | | 3.989 | 3.974 |
| 6 | Second | −4.04 | 0.350 | 1.621 | 26.0 | 3.731 | 3.725 |
| 7 | Lens | −32.62 | 0.578 | | | 3.432 | 3.432 |
| 8 | Third | 33.46 | 1.365 | 1.680 | 19.2 | 3.416 | 3.416 |
| 9 | Lens | −15.45 | 0.591 | | | 3.514 | 3.514 |
| 10 | Fourth | −4.29 | 0.600 | 1.642 | 23.9 | 3.500 | 3.500 |
| 11 | Lens | −5.65 | 0.025 | | | 3.660 | 3.645 |
| 12 | Fifth | −6.21 | 0.700 | 1.571 | 37.4 | 3.515 | 3.467 |
| 13 | Lens | −6.90 | 1.020 | | | 3.432 | 3.358 |

TABLE 7-continued

| Surface Number | Element | Radius of Curvature | Thickness/ Distance | Refractive Index | Abbe Number | Long Axis Effective Radius | Short Axis Effective Radius |
|---|---|---|---|---|---|---|---|
| 14 | Filter | Infinity | 0.110 | 1.519 | 64.2 | | |
| 15 | | Infinity | 19.474 | | | | |
| 16 | Imaging Plane | Infinity | 0.000 | | | | |

TABLE 8

| Surface Number | k | A | B | C | D | E |
|---|---|---|---|---|---|---|
| 4 | −8.978988E−01 | 3.342689E−04 | 9.811308E−06 | 3.259029E−06 | −1.096808E−06 | 1.633472E−07 |
| 5 | 0.000000E+00 | −1.954748E−03 | 1.116968E−03 | −2.027167E−04 | 1.646702E−05 | −3.684789E−07 |
| 6 | 0.000000E+00 | 7.112338E−03 | 2.233427E−03 | −9.075318E−04 | 1.503742E−04 | −1.254067E−05 |
| 7 | 0.000000E+00 | 3.843691E−03 | 2.567273E−03 | −1.243584E−03 | 2.358799E−04 | −2.329037E−05 |
| 8 | 0.000000E+00 | −7.971496E−03 | 4.865764E−03 | −2.210466E−03 | 5.588101E−04 | −8.721498E−05 |
| 9 | 0.000000E+00 | −1.378109E−02 | 7.124262E−03 | −2.856314E−03 | 7.504402E−04 | −1.267996E−04 |
| 10 | 0.000000E+00 | −1.122257E−02 | 1.015267E−02 | −3.990784E−03 | 9.996253E−04 | −1.624050E−04 |
| 11 | 0.000000E+00 | 7.091298E−04 | 1.727424E−03 | −9.680097E−04 | 2.565968E−04 | −4.035018E−05 |
| 12 | 0.000000E+00 | 5.823074E−03 | −3.373652E−03 | 1.573831E−03 | −3.711246E−04 | 4.960845E−05 |
| 13 | 0.000000E+00 | 3.187576E−03 | −4.249425E−04 | 5.310342E−04 | −1.310559E−04 | 1.354069E−05 |

| Surface Number | F | G | H | J |
|---|---|---|---|---|
| 4 | −1.389287E−08 | 6.783928E−10 | −1.768245E−11 | 1.903248E−13 |
| 5 | −3.486956E−08 | 2.871918E−09 | −8.322917E−11 | 8.862580E−13 |
| 6 | 4.534019E−07 | 5.279202E−09 | −9.495048E−10 | 2.218286E−11 |
| 7 | 1.253680E−06 | −3.433248E−08 | 3.397689E−10 | 1.312461E−12 |
| 8 | 8.632918E−06 | −5.292905E−07 | 1.834492E−08 | −2.747696E−10 |
| 9 | 1.353307E−05 | −8.792639E−07 | 3.169562E−08 | −4.850270E−10 |
| 10 | 1.697238E−05 | −1.099826E−06 | 4.015539E−08 | −6.298572E−10 |
| 11 | 4.009546E−06 | −2.482701E−07 | 8.721996E−09 | −1.321885E−10 |
| 12 | −3.811060E−06 | 1.601124E−07 | −3.147380E−09 | 1.691917E−11 |
| 13 | −3.783329E−07 | −3.963421E−08 | 3.377379E−09 | −7.527431E−11 |

Figure 9:
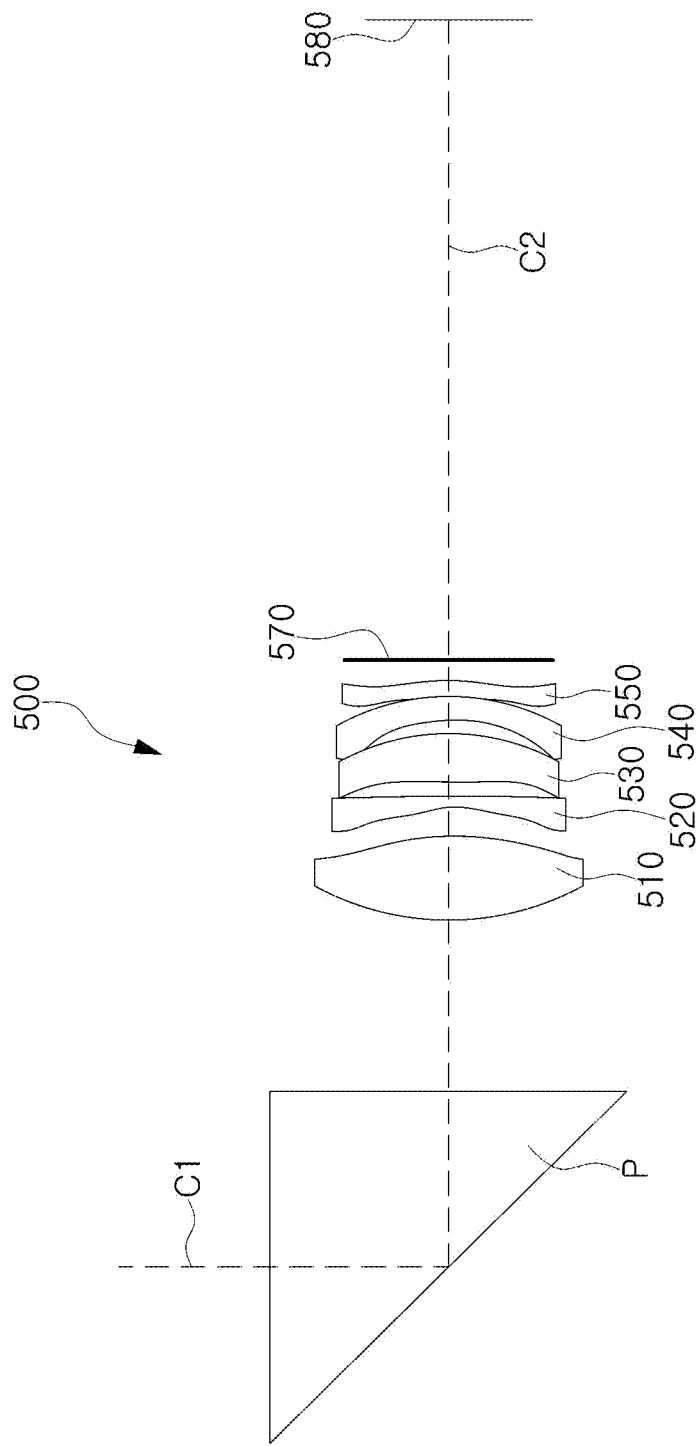
FIG. 9 is a configuration diagram of a fifth example of an optical imaging system.
Figure 10:
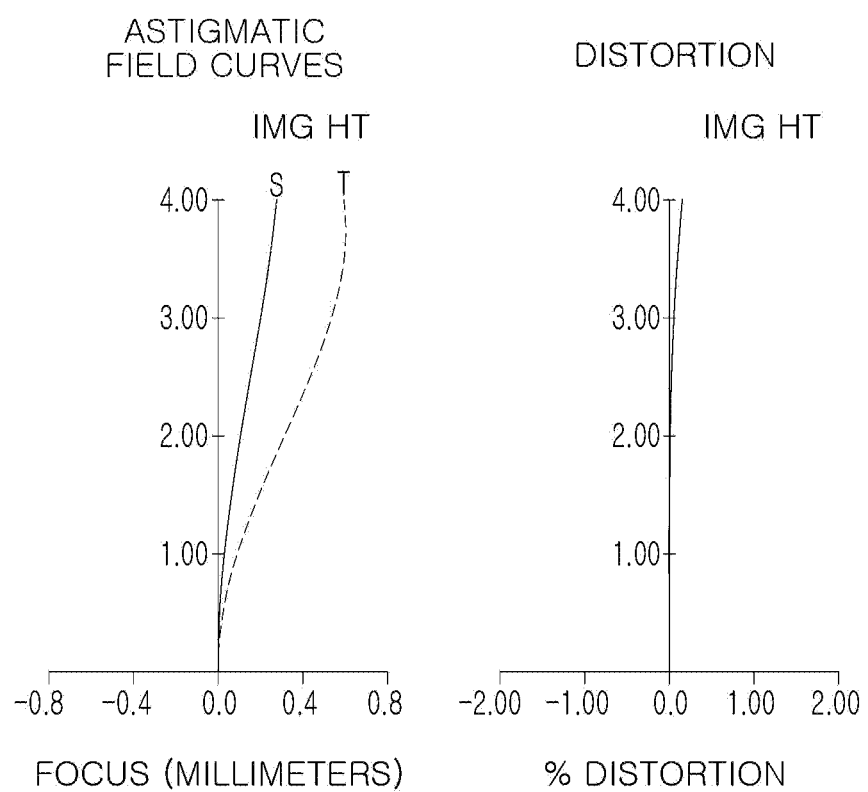
FIG. 10 shows aberration curves of the optical imaging system illustrated in FIG. 9.

FIG. 9 is a configuration diagram of a fifth example of an optical imaging system, and FIG. 10 shows aberration curves of the optical imaging system illustrated in FIG. 9.

An optical imaging system 500 includes a first lens 510, a second lens 520, a third lens 530, a fourth lens 540, and a fifth lens 550.

The first lens 510 has a positive refractive power. The first lens 510 has a convex object-side surface and a convex image-side surface. The second lens 520 has a negative refractive power. The second lens 520 has a concave object-side surface and a convex image-side surface. The third lens 530 has a positive refractive power. The third lens 530 has a convex object-side surface and a convex image-side surface. The fourth lens 540 has a negative refractive power. The fourth lens 540 has a concave object-side surface and a convex image-side surface. The fifth lens 550 has a positive refractive power. The fifth lens 550 has a concave object-side surface and a convex image-side surface.

The optical imaging system 500 further includes a prism P, a filter 570, and an image sensor 580.

The optical imaging system 500 includes the prism P as a means for folding an optical path of light in the optical imaging system 500. The prism P folds a first optical axis C1 to form a second optical axis C2. The second optical axis C2 is substantially perpendicular to the first optical axis C1. The prism P is disposed on the object side of the first lens 510, and reflects light reflected from an object (a subject) to the image sensor 580.

The filter 570 is disposed in front of the image sensor 580, and blocks infrared rays included in incident light. The image sensor 580 includes a plurality of optical sensors, and is configured to convert an optical signal into an electrical signal.

Table 9 below illustrates optical characteristics of the elements of the optical imaging system 500, and Table 10 below illustrates aspherical surface coefficients of the lenses of the optical imaging system 500.

TABLE 9

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 8.000 | 1.519 | 64.2 | | |
| 2 | | Infinity | 8.000 | 1.519 | 64.2 | | |
| 3 | | Infinity | 11.000 | | | | |
| 4 | First | 13.49 | 4.250 | 1.537 | 55.7 | 6.850 | 6.465 |

TABLE 9-continued

| Surface Number | Element | Radius of Curvature | Thickness/ Distance | Refractive Index | Abbe Number | Long Axis Effective Radius | Short Axis Effective Radius |
|---|---|---|---|---|---|---|---|
| 5 | Lens | −13.00 | 1.439 | | | 6.614 | 6.277 |
| 6 | Second | −6.29 | 0.600 | 1.621 | 26.0 | 6.017 | 5.851 |
| 7 | Lens | −80.4985 | 0.546 | | | 5.628644211 | 5.536 |
| 8 | Third | 36.0447 | 2.486 | 1.680 | 19.2 | 5.575668112 | 5.474 |
| 9 | Lens | −21.7129 | 0.918 | | | 5.47 | 5.462 |
| 10 | Fourth | −6.53 | 1.185 | 1.642 | 23.9 | 5.433 | 5.416 |
| 11 | Lens | −9.96 | 0.025 | | | 5.674 | 5.607 |
| 12 | Fifth | −12.00 | 0.702 | 1.571 | 37.4 | 5.479 | 5.382 |
| 13 | Lens | −11.90 | 1.020 | | | 5.267 | 5.159 |
| 14 | Filter | Infinity | 0.110 | 1.519 | 64.2 | | |
| 15 | | Infinity | 32.901 | | | | |
| 16 | Imaging Plane | Infinity | 0.000 | | | | |

TABLE 10

| Surface Number | k | A | B | C | D | E |
|---|---|---|---|---|---|---|
| 4 | −1.926415E+00 | −3.458809E−04 | 6.839703E−05 | −5.897420E−06 | 3.367439E−07 | −1.478965E−08 |
| 5 | 0.000000E+00 | −1.365129E−03 | 3.982860E−04 | −3.887428E−05 | 2.034126E−06 | −6.374928E−08 |
| 6 | 0.000000E+00 | 3.048769E−03 | −5.601346E−05 | 9.025745E−06 | −2.154679E−06 | 2.117750E−07 |
| 7 | 0.000000E+00 | 3.215854E−03 | −8.654884E−04 | 1.322561E−04 | −1.323203E−05 | 8.662546E−07 |
| 8 | 0.000000E+00 | −1.389071E−03 | 1.797932E−05 | 2.224101E−05 | −4.829092E−06 | 4.434618E−07 |
| 9 | 0.000000E+00 | −3.836079E−03 | 7.010265E−04 | −6.567979E−05 | 2.103576E−06 | 1.156794E−07 |
| 10 | 0.000000E+00 | −2.363740E−03 | 6.570948E−04 | −8.000873E−05 | 7.189335E−06 | −4.582154E−07 |
| 11 | 0.000000E+00 | 2.304568E−04 | 2.044147E−04 | −5.660216E−05 | 7.241390E−06 | −5.320699E−07 |
| 12 | 0.000000E+00 | 2.771085E−04 | 4.101756E−05 | −2.521864E−05 | 4.222455E−06 | −3.088618E−07 |
| 13 | 0.000000E+00 | 5.114974E−04 | −2.003331E−05 | 6.734665E−06 | 1.717765E−07 | −4.363404E−08 |

| Surface Number | F | G | H | J |
|---|---|---|---|---|
| 4 | 4.693708E−10 | −9.546222E−12 | 1.086785E−13 | −5.229203E−16 |
| 5 | 1.253787E−09 | −1.565920E−11 | 1.205625E−13 | −4.675532E−16 |
| 6 | −1.062136E−08 | 2.944032E−10 | −4.316113E−12 | 2.630149E−14 |
| 7 | −3.650093E−08 | 9.498587E−10 | −1.385081E−11 | 8.640705E−14 |
| 8 | −2.232732E−08 | 6.436439E−10 | −9.988304E−12 | 6.490409E−14 |
| 9 | −1.364344E−08 | 5.403891E−10 | −1.004054E−11 | 7.306798E−14 |
| 10 | 1.889576E−08 | −4.640596E−10 | 6.089890E−12 | −3.270233E−14 |
| 11 | 2.376956E−08 | −6.374257E−10 | 9.420963E−12 | −5.892389E−14 |
| 12 | 1.254960E−08 | −3.080387E−10 | 4.442056E−12 | −2.939438E−14 |
| 13 | 2.101975E−09 | −5.576495E−11 | 1.014623E−12 | −9.685580E−15 |

Figure 11:
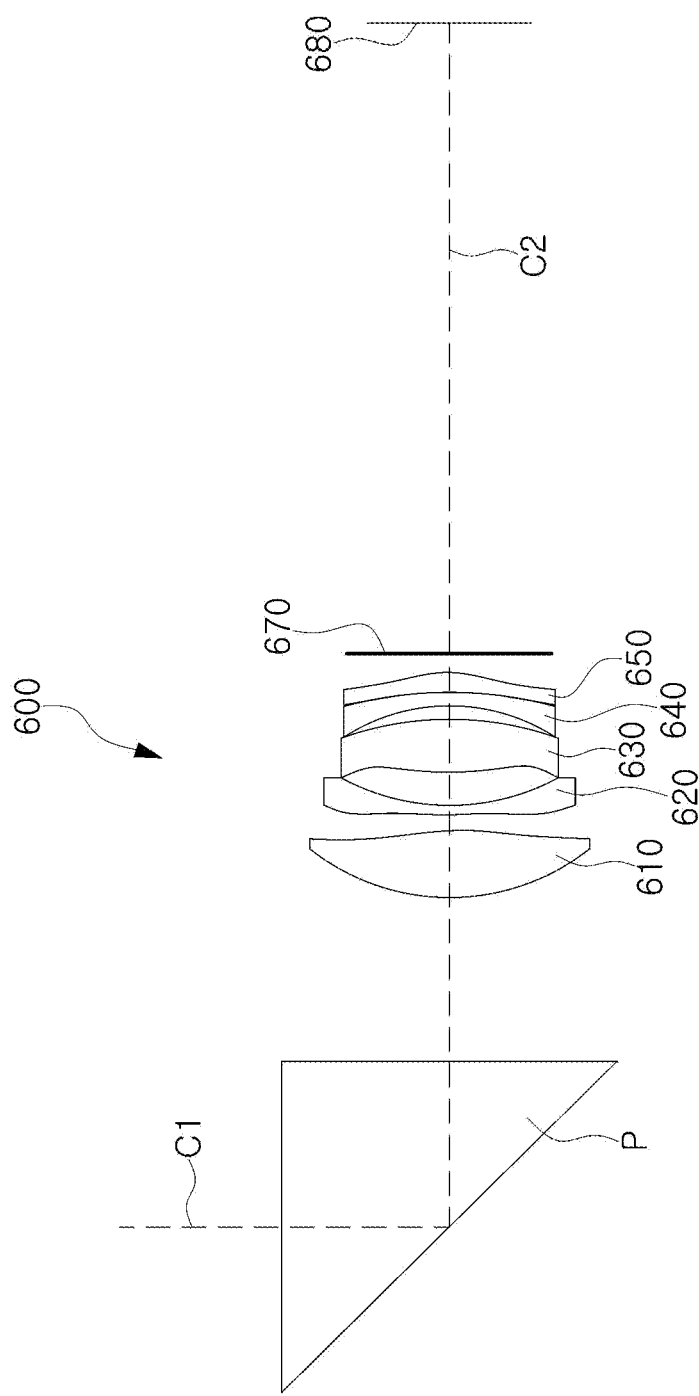
FIG. 11 is a configuration diagram of a sixth example of an optical imaging system.
Figure 12:
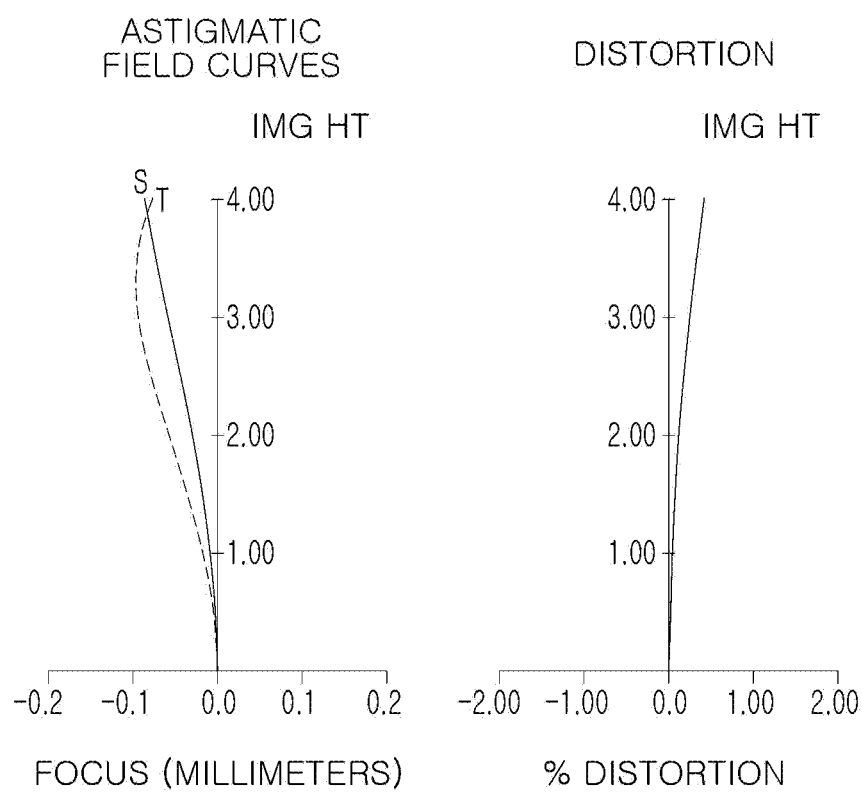
FIG. 12 shows aberration curves of the optical imaging system illustrated in FIG. 11.

FIG. 11 is a configuration diagram of a sixth example of an optical imaging system, and FIG. 12 shows aberration curves of the optical imaging system illustrated in FIG. 11.

An optical imaging system 600 includes a first lens 610, a second lens 620, a third lens 630, a fourth lens 640, and a fifth lens 650.

The first lens 610 has a positive refractive power. The first lens 610 has a convex object-side surface and a convex image-side surface. The second lens 620 has a negative refractive power. The second lens 620 has a convex object-side surface and a concave image-side surface. The third lens 630 has a positive refractive power. The third lens 630 has a convex object-side surface and a convex image-side surface. The fourth lens 640 has a negative refractive power. The fourth lens 640 has a concave object-side surface and a convex image-side surface. The fifth lens 650 has a positive refractive power. The fifth lens 650 has a concave object-side surface and a convex image-side surface.

The optical imaging system 600 further includes a prism P, a filter 670, and an image sensor 680.

The optical imaging system 600 includes the prism P as a means for folding an optical path of light in the optical imaging system 600. The prism P folds a first optical axis C1 to form a second optical axis C2. The second optical axis C2 is substantially perpendicular to the first optical axis C1. The prism P is disposed on the object side of the first lens 610, and reflects light reflected from an object (a subject) to the image sensor 680.

The filter 670 is disposed in front of the image sensor 680, and blocks infrared rays included in incident light. The image sensor 680 includes a plurality of optical sensors, and is configured to convert an optical signal into an electrical signal.

Table 11 below illustrates optical characteristics of the elements of the optical imaging system 600, and Table 12 below illustrates aspherical surface coefficients of the lenses of the optical imaging system 600.

TABLE 11

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 8.000 | 1.519 | 64.2 | | |
| 2 | | Infinity | 8.000 | 1.519 | 64.2 | | |
| 3 | | Infinity | 11.000 | | | | |
| 4 | First | 11.08 | 3.368 | 1.537 | 55.7 | 7.497 | 6.784 |
| 5 | Lens | −33.62 | 0.978 | | | 7.376 | 6.627 |
| 6 | Second | 26.46 | 0.450 | 1.621 | 26.0 | 6.787 | 6.160 |
| 7 | Lens | 6.14 | 1.809 | | | 5.958 | 5.685 |
| 8 | Third | 16.81 | 3.000 | 1.680 | 19.2 | 5.899 | 5.594 |
| 9 | Lens | −44.57 | 0.745 | | | 5.600 | 5.570 |
| 10 | Fourth | −7.01 | 0.675 | 1.642 | 23.9 | 5.546 | 5.547 |
| 11 | Lens | −21.52 | 0.094 | | | 5.647 | 5.591 |
| 12 | Fifth | −11.49 | 0.871 | 1.571 | 37.4 | 5.635 | 5.572 |
| 13 | Lens | −7.50 | 1.020 | | | 5.591 | 5.525 |
| 14 | Filter | Infinity | 0.110 | 1.519 | 64.2 | | |
| 15 | | Infinity | 34.086 | | | | |
| 16 | Imaging Plane | Infinity | 0.000 | | | | |

TABLE 12

| Surface Number | k | A | B | C | D | E | F | G | H | J |
|---|---|---|---|---|---|---|---|---|---|---|
| 4 | −1.334903 E+00 | 1.437283 E−04 | −1.418221 E−05 | −3.105442 E−08 | 7.630507 E−08 | −4.883165 E−09 | 1.521129 E−10 | −2.649441 E−12 | 2.466673 E−14 | −9.557650 E−17 |
| 5 | 0.000000 E+00 | 3.428180 E−04 | −4.429064 E−05 | 3.075019 E−06 | −9.152889 E−08 | 6.959085 E−10 | 2.850905 E−11 | −8.351700 E−13 | 8.820996 E−15 | −3.394934 E−17 |
| 6 | 0.000000 E+00 | −2.016586 E−03 | 2.279021 E−04 | −2.001370 E−05 | 1.168631 E−06 | −4.475729 E−08 | 1.094125 E−09 | −1.590928 E−11 | 1.196769 E−13 | −3.202616 E−16 |
| 7 | 0.000000 E+00 | −2.896371 E−03 | 1.377572 E−04 | −8.960539 E−06 | 4.487245 E−07 | −2.228941 E−08 | 1.002141 E−09 | −3.349236 E−11 | 6.543652 E−13 | −5.471059 E−15 |
| 8 | 0.000000 E+00 | −1.226523 E−03 | −1.573624 E−04 | 2.922417 E−05 | −2.597423 E−06 | 1.555610 E−07 | −6.259888 E−09 | 1.559262 E−10 | −2.153789 E−12 | 1.268957 E−14 |
| 9 | 0.000000 E+00 | −1.676474 E−03 | −3.328884 E−05 | 2.478524 E−05 | −3.905747 E−06 | 3.613336 E−07 | −1.993049 E−08 | 6.328937 E−10 | −1.066414 E−11 | 7.401292 E−14 |
| 10 | 0.000000 E+00 | 6.309308 E−04 | 1.244395 E−04 | −6.393388 E−06 | −1.008014 E−06 | 1.769030 E−07 | −1.201991 E−08 | 4.225569 E−10 | −7.555825 E−12 | 5.436580 E−14 |
| 11 | 0.000000 E+00 | 3.119158 E−04 | −6.178483 E−04 | 1.893664 E−04 | −2.576223 E−05 | 1.950900 E−06 | −8.782684 E−08 | 2.344687 E−09 | −3.439634 E−11 | 2.141615 E−13 |
| 12 | 0.000000 E+00 | 2.613493 E−03 | −6.066246 E−04 | 1.414237 E−04 | −1.760544 E−05 | 1.251677 E−06 | −5.306824 E−08 | 1.334720 E−09 | −1.851261 E−11 | 1.100020 E−13 |
| 13 | 0.000000 E+00 | 2.719419 E−03 | 2.278694 E−04 | −7.843138 E−05 | 1.071512 E−05 | −8.400996 E−07 | 3.973286 E−08 | −1.115425 E−09 | 1.708092 E−11 | −1.096460 E−13 |

Figure 13:
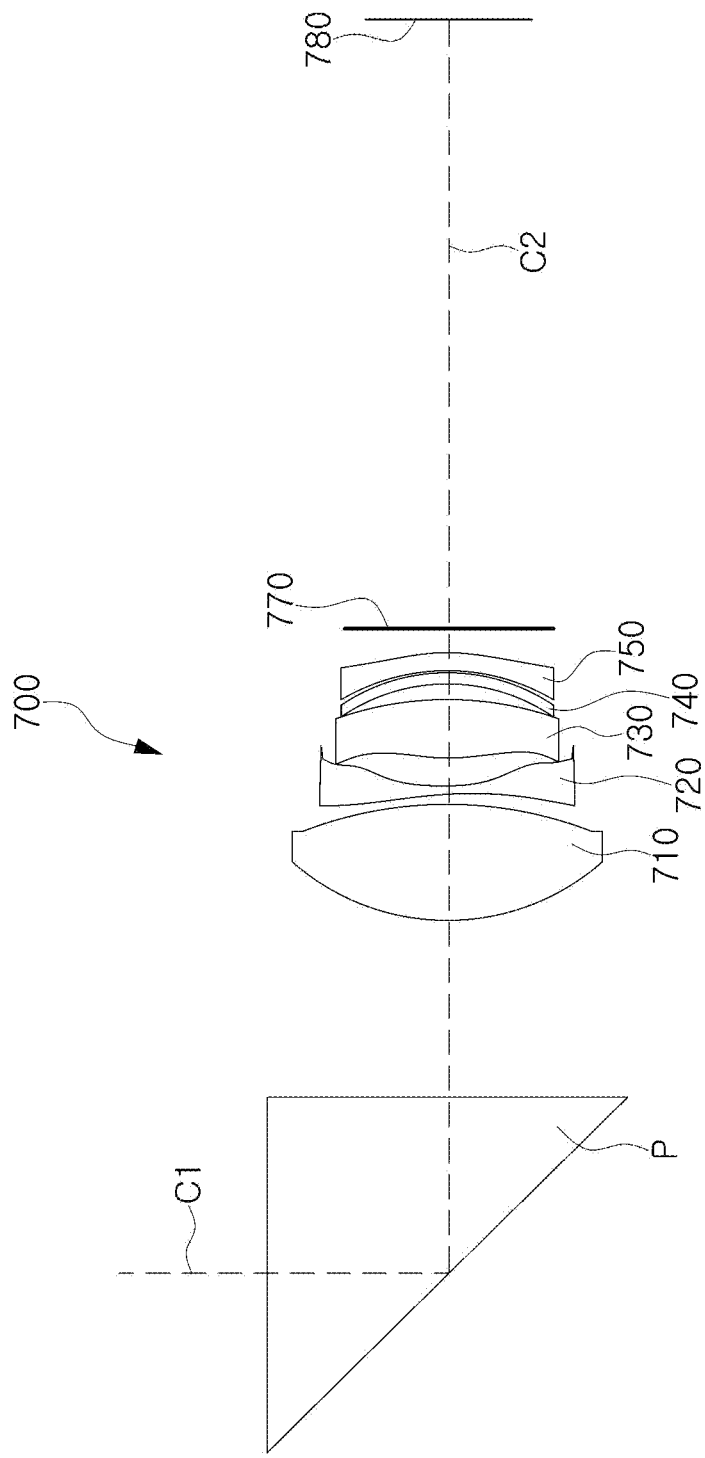
FIG. 13 is a configuration diagram of a seventh example of an optical imaging system.
Figure 14:
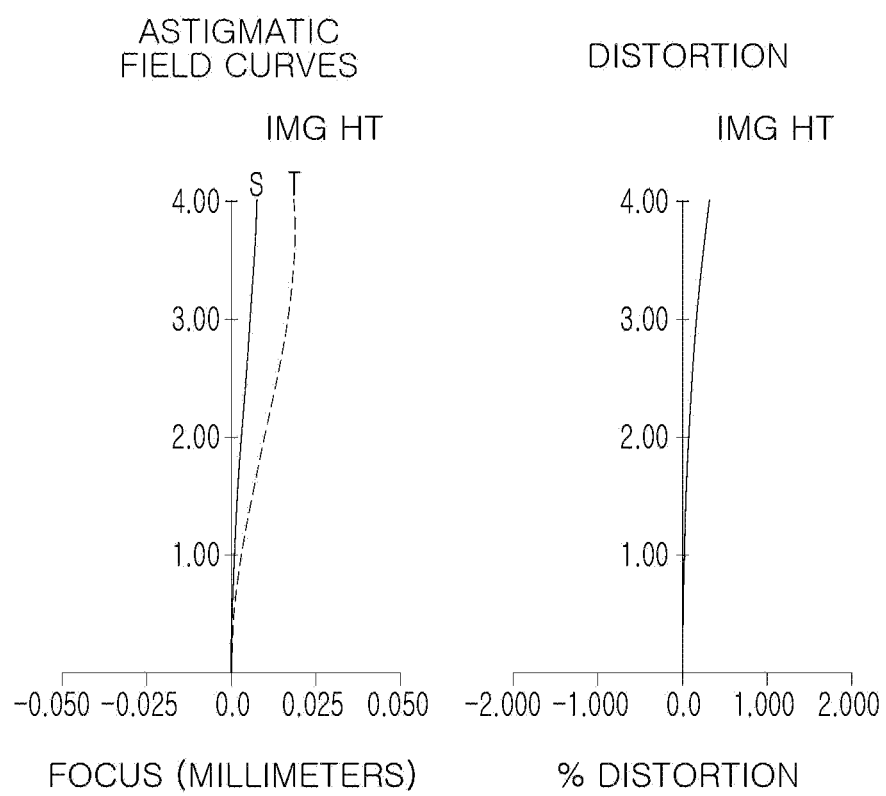
FIG. 14 shows aberration curves of the optical imaging system illustrated in FIG. 13.

FIG. 13 is a configuration diagram of a seventh example of an optical imaging system, and FIG. 14 shows aberration curves of the optical imaging system illustrated in FIG. 13.

An optical imaging system 700 includes a first lens 710, a second lens 720, a third lens 730, a fourth lens 740, and a fifth lens 750.

The first lens 710 has a positive refractive power. The first lens 710 has a convex object-side surface and a convex image-side surface. The second lens 720 has a negative refractive power. The second lens 720 has a convex object-side surface and a concave image-side surface. The third lens 730 has a positive refractive power. The third lens 730 has a convex object-side surface and a convex image-side surface. The fourth lens 740 has a negative refractive power. The fourth lens 740 has a concave object-side surface and a convex image-side surface. The fifth lens 750 has a negative refractive power. The fifth lens 750 has a concave object-side surface and a convex image-side surface.

The optical imaging system 700 includes a prism P, a filter 770, and an image sensor 780.

The optical imaging system 700 includes the prism P as a means for folding an optical path of light in the optical imaging system 700. The prism P folds a first optical axis C1 to form a second optical axis C2. The second optical axis C2 is substantially perpendicular to the first optical axis C1. The prism P is disposed on the object side of the first lens 710, and reflects light reflected from an object (a subject) to the image sensor 780.

The filter 770 is disposed in front of the image sensor 780, and blocks infrared rays included in incident light. The image sensor 780 includes a plurality of optical sensors, and is configured to convert an optical signal into an electrical signal.

Table 13 below illustrates optical characteristics of the elements of the optical imaging system 700, and Table 14 below illustrates aspherical surface coefficients of the lenses of the optical imaging system 700.

TABLE 13

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 8.000 | 1.519 | 64.2 | | |
| 2 | | Infinity | 8.000 | 1.519 | 64.2 | | |
| 3 | | Infinity | 11.000 | | | | |
| 4 | First | 10.54 | 5.751 | 1.537 | 55.7 | 7.717 | 7.038 |
| 5 | Lens | −18.00 | 0.506 | | | 7.164 | 6.560 |
| 6 | Second | 150.16 | 0.450 | 1.621 | 26.0 | 6.442 | 6.060 |
| 7 | Lens | 6.32 | 1.506 | | | 5.684 | 5.504 |
| 8 | Third | 17.33 | 2.863 | 1.680 | 19.2 | 5.586 | 5.433 |
| 9 | Lens | −71.51 | 0.840 | | | 5.370 | 5.344 |
| 10 | Fourth | −7.17 | 0.500 | 1.642 | 23.9 | 5.322 | 5.312 |
| 11 | Lens | −9.79 | 0.216 | | | 5.343 | 5.311 |
| 12 | Fifth | −6.93 | 0.964 | 1.571 | 37.4 | 5.297 | 5.258 |
| 13 | Lens | −7.71 | 1.020 | | | 5.307 | 5.227 |
| 14 | Filter | Infinity | 0.110 | 1.519 | 64.2 | | |
| 15 | | Infinity | 30.872 | | | | |
| 16 | Imaging Plane | infinity | 0.000 | | | | |

TABLE 14

| Surface Number | k | A | B | C | D | E | F | G | H | J |
|---|---|---|---|---|---|---|---|---|---|---|
| 4 | −1.193856 E+00 | 0.000000 E+00 | 0.000000 E+00 | 0.000000 E+00 | 0.000000 E+00 | 0.000000 E+00 | 0.000000 E+00 | 0.000000 E+00 | 0.000000 E+00 | 0.000000 E+00 |
| 5 | 1.504510 E−06 | 6.621025 E−04 | −1.086844 E−03 | −2.820442 E−03 | −1.501674 E−03 | −9.758166 E−04 | 7.638232 E−04 | −1.238106 E−03 | 1.855882 E−03 | 3.133256 E−03 |
| 6 | 4.332536 E−06 | −1.433201 E−04 | −2.380271 E−05 | 6.429998 E−05 | −1.479482 E−04 | −1.311491 E−04 | 3.443445 E−04 | 3.003377 E−04 | −3.541866 E−04 | −2.343984 E−04 |
| 7 | −4.717437 E−07 | 1.517403 E−05 | 1.070361 E−05 | 1.255519 E−05 | 2.912588 E−06 | 9.883665 E−05 | −1.170494 E−04 | −3.174958 E−05 | 1.197155 E−04 | 4.284917 E−05 |
| 8 | 3.480134 E−08 | −8.902469 E−07 | −1.105251 E−06 | −1.937055 E−06 | −1.521371 E−06 | 9.044059 E−07 | 1.835892 E−05 | 3.196701 E−06 | −1.791689 E−05 | −5.602134 E−06 |
| 9 | −1.370776 E−09 | 3.184173 E−08 | 6.080537 E−08 | 1.110640 E−07 | −1.776806 E−08 | −1.286184 E−07 | −1.561489 E−06 | −2.928598 E−07 | 1.442878 E−06 | 4.427406 E−07 |
| 10 | 2.952906 E−11 | −7.119725 E−10 | −1.943911 E−09 | −3.096124 E−09 | 5.312865 E−09 | 5.703261 E−09 | 7.688650 E−08 | 1.762161 E−08 | −6.800067 E−08 | −2.142198 E−08 |
| 11 | −3.418133 E−13 | 9.765947 E−12 | 3.642096 E−11 | 3.759426 E−11 | −2.391840 E−10 | −1.119290 E−10 | −2.202932 E−09 | −6.068187 E−10 | 1.887510 E−09 | 6.231165 E−10 |
| 12 | 1.863633 E−15 | −7.560416 E−14 | −3.733597 E−13 | −5.828217 E−14 | 4.673166 E−12 | 8.047172 E−13 | 3.426250 E−11 | 1.088149 E−11 | −2.872510 E−11 | −1.000398 E−11 |
| 13 | −2.960287 E−18 | 2.546754 E−16 | 1.628303 E−15 | −1.543269 E−15 | −3.473409 E−14 | 7.013289 E−16 | −2.246265 E−13 | −7.911005 E−14 | 1.857020 E−13 | 6.814492 E−14 |

Figure 15:
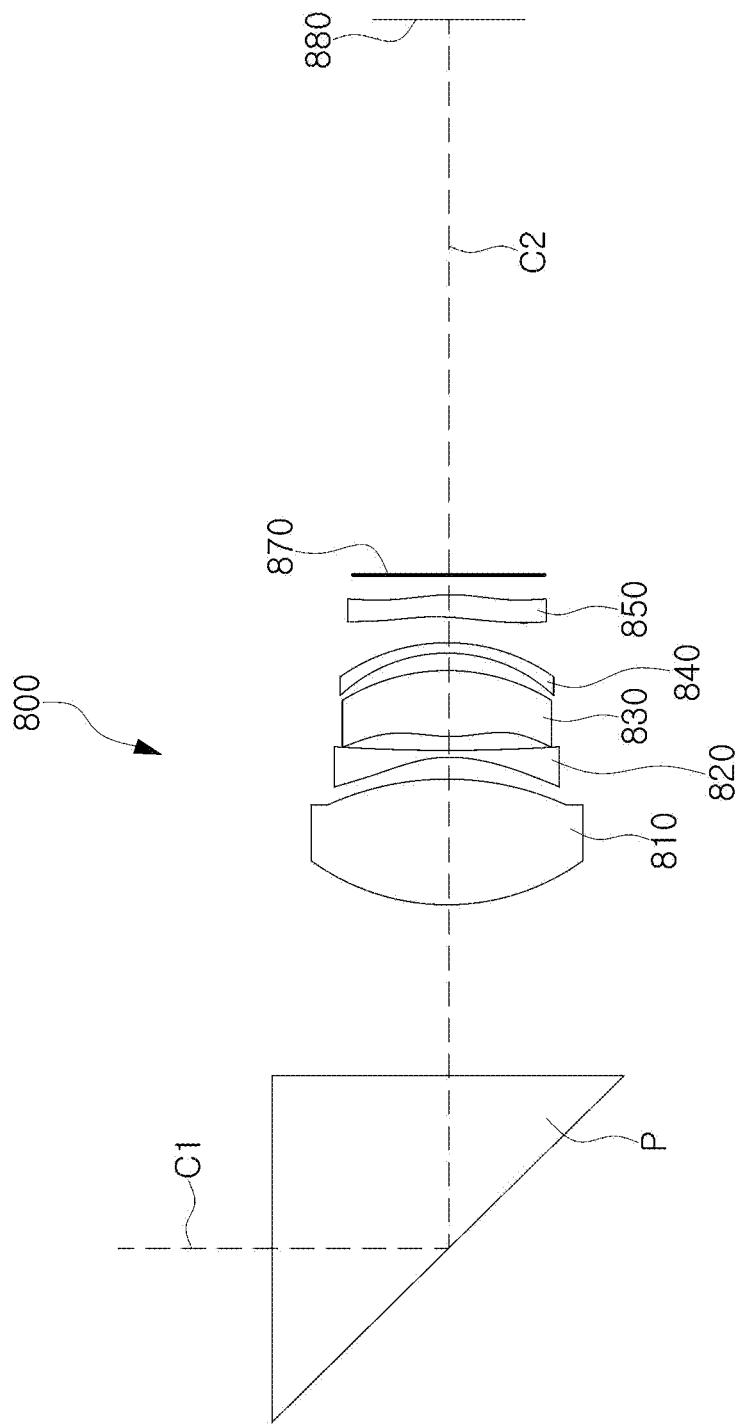
FIG. 15 is a configuration diagram of an eighth example of an optical imaging system.
Figure 16:
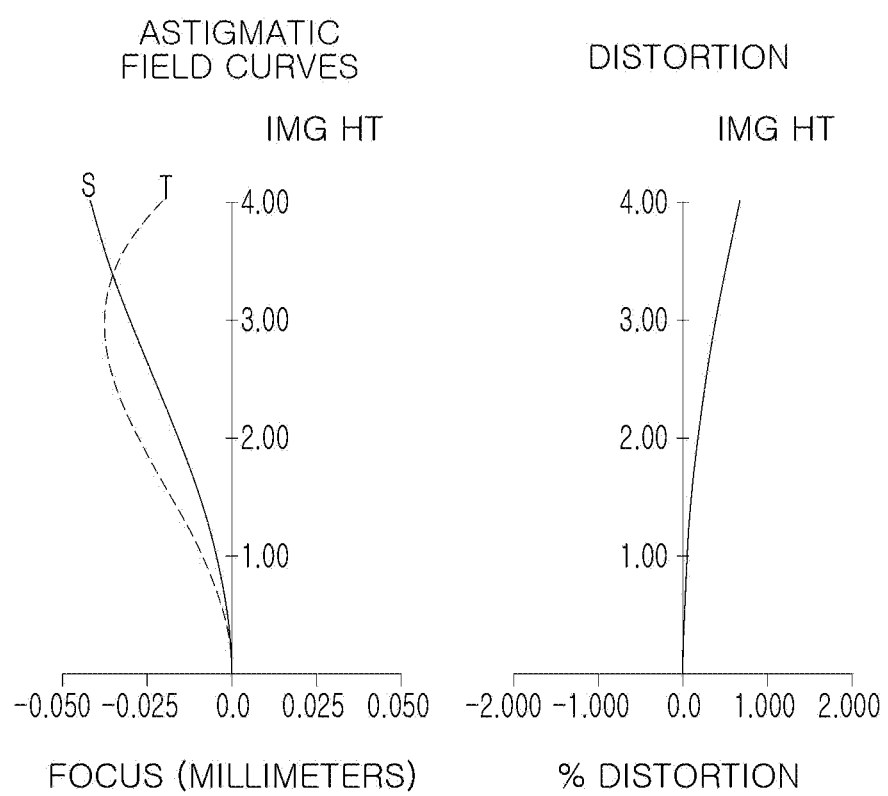
FIG. 16 shows aberration curves of the optical imaging system illustrated in FIG. 15.

FIG. 15 is a configuration diagram of an eighth example of an optical imaging system, and FIG. 16 shows aberration curves of the optical imaging system illustrated in FIG. 15.

An optical imaging system 800 includes a first lens 810, a second lens 820, a third lens 830, a fourth lens 840, and a fifth lens 850.

The first lens 810 has a positive refractive power. The first lens 810 has a convex object-side surface and a convex image-side surface. The second lens 820 has a negative refractive power. The second lens 820 has a concave object-side surface and a convex image-side surface. The third lens 830 has a positive refractive power. The third lens 830 has a convex object-side surface and a convex image-side surface. The fourth lens 840 has a negative refractive power. The fourth lens 840 has a concave object-side surface and a convex image-side surface. The fifth lens 850 has a negative refractive power. The fifth lens 850 has a concave object-side surface and a convex image-side surface.

The optical imaging system 800 further includes a prism P, a filter 870, and an image sensor 880.

The optical imaging system 800 includes the prism P as a means for folding an optical path of light in the optical imaging system 800. The prism P folds a first optical axis C1 to form a second optical axis C2. The second optical axis C2 is substantially perpendicular to the first optical axis C1. The prism P is disposed on the object side of the first lens 810, and reflects light reflected from an object (a subject) to the image sensor 880.

The filter 870 is disposed in front of the image sensor 880, and blocks infrared rays included in incident light. The image sensor 880 includes a plurality of optical sensors, and is configured to convert an optical signal into an electrical signal.

Table 15 below illustrates optical characteristics of the elements of the optical imaging system 800, and Table 16 below illustrates aspherical surface coefficients of the lenses of the optical imaging system 800.

TABLE 15

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 8.000 | 1.519 | 64.2 | | |
| 2 | | Infinity | 8.000 | 1.519 | 64.2 | | |
| 3 | | Infinity | 11.000 | | | | |
| 4 | First | 12.72 | 6.400 | 1.537 | 55.7 | 7.000 | 6.752 |
| 5 | Lens | −13.52 | 1.073 | | | 6.365 | 6.164 |
| 6 | Second | −6.21 | 0.450 | 1.621 | 26.0 | 5.843 | 5.717 |
| 7 | Lens | −85.65 | 0.879 | | | 5.349 | 5.308 |
| 8 | Third | 35.52 | 3.220 | 1.680 | 19.2 | 5.312 | 5.267 |
| 9 | Lens | −22.75 | 0.984 | | | 5.461 | 5.457 |
| 10 | Fourth | −6.53 | 0.500 | 1.642 | 23.9 | 5.400 | 5.408 |
| 11 | Lens | −8.96 | 1.438 | | | 5.605 | 5.595 |
| 12 | Fifth | −13.22 | 0.993 | 1.571 | 37.4 | 5.182 | 5.050 |
| 13 | Lens | −14.69 | 1.020 | | | 4.998 | 4.847 |
| 14 | Filter | Infinity | 0.110 | 1.519 | 64.2 | | |
| 15 | | Infinity | 28.749 | | | | |
| 16 | Imaging Plane | infinity | 0.000 | | | | |

TABLE 16

| Surface Number | k | A | B | C | D | E | F | G | H | J |
|---|---|---|---|---|---|---|---|---|---|---|
| 4 | −9.757848 E+00 | 9.139730 E−01 | 2.712812 E−05 | 4.203789 E−07 | −5.256173 E−07 | 3.020344 E−08 | −9.795909 E−09 | 1.824579 E−11 | −1.813642 E−12 | 7.445427 E−14 |
|   | 0.000000 | −8.111772 E−04 | 2.487219 E−04 | −2.826972 E−05 | 1.835052 E−06 | −7.477928 E−08 | 1.957615 E−09 | −3.193428 E−11 | 2.947405 E−13 | −1.172690 E−15 |
| 5 | E+00 |  |  |  |  |  |  |  |  |  |
|   | 0.000000 | 1.972530 E−03 | 2.749843 E−04 | −4.361937 E−05 | 2.598095 E−06 | −5.347659 E−08 | −1.307579 E−09 | 9.541175 E−11 | −1.980515 E−12 | 1.496192 E−14 |
| 6 | E+00 |  |  |  |  |  |  |  |  |  |
|   | 0.000000 | 2.034495 E−03 | −2.723539 E−04 | 5.733461 E−05 | −7.830011 E−06 | 5.948070 E−07 | −2.641741 E−08 | 7.045499 E−10 | −1.078721 E−11 | 7.447068 E−14 |
| 7 | E+00 |  |  |  |  |  |  |  |  |  |
|   | 0.000000 | −1.162420 E−03 | −4.010244 E−04 | 1.410042 E−05 | −1.095346 E−06 | −2.333944 E−08 | 6.866721 E−09 | −3.471108 E−10 | 7.359434 E−12 | −5.760854 E−14 |
| 8 | E+00 |  |  |  |  |  |  |  |  |  |
|   | 0.000000 | −3.135367 E−03 | 4.935570 E−04 | −6.601389 E−05 | 6.804443 E−06 | −4.997774 E−07 | 2.396096 E−08 | −7.016890 E−10 | 1.136310 E−11 | −7.797573 E−14 |
| 9 | E+00 |  |  |  |  |  |  |  |  |  |
|   | 0.000000 | −2.538227 E−03 | 8.801697 E−04 | −1.266825 E−04 | 1.202803 E−05 | −7.750280 E−07 | 3.325312 E−08 | −9.028349 E−10 | 1.396236 E−11 | −9.344102 E−14 |
| 10 | E+00 |  |  |  |  |  |  |  |  |  |
|   | 0.000000 | −1.123121 E−03 | 2.683522 E−04 | −4.850797 E−05 | 4.366799 E−06 | −2.292942 E−07 | 7.406011 E−09 | −1.465148 E−10 | 1.640165 E−12 | −7.998878 E−15 |
| 11 | E+00 |  |  |  |  |  |  |  |  |  |
|   | 0.000000 | 1.120322 E−03 | −1.562910 E−04 | 3.913747 E−05 | −5.623336 E−06 | 5.082026 E−07 | −2.875907 E−08 | 9.898608 E−10 | −1.896493 E−11 | 1.548353 E−13 |
| 12 | E+00 |  |  |  |  |  |  |  |  |  |
|   | 0.000000 | 1.230628 E−03 | −1.045172 E−04 | 4.140568 E−05 | −6.716568 E−06 | 6.412854 E−07 | −3.841481 E−08 | 1.420144 E−09 | −2.955939 E−11 | 2.637168 E−13 |
| 13 | E+00 |  |  |  |  |  |  |  |  |  |

Figure 17:
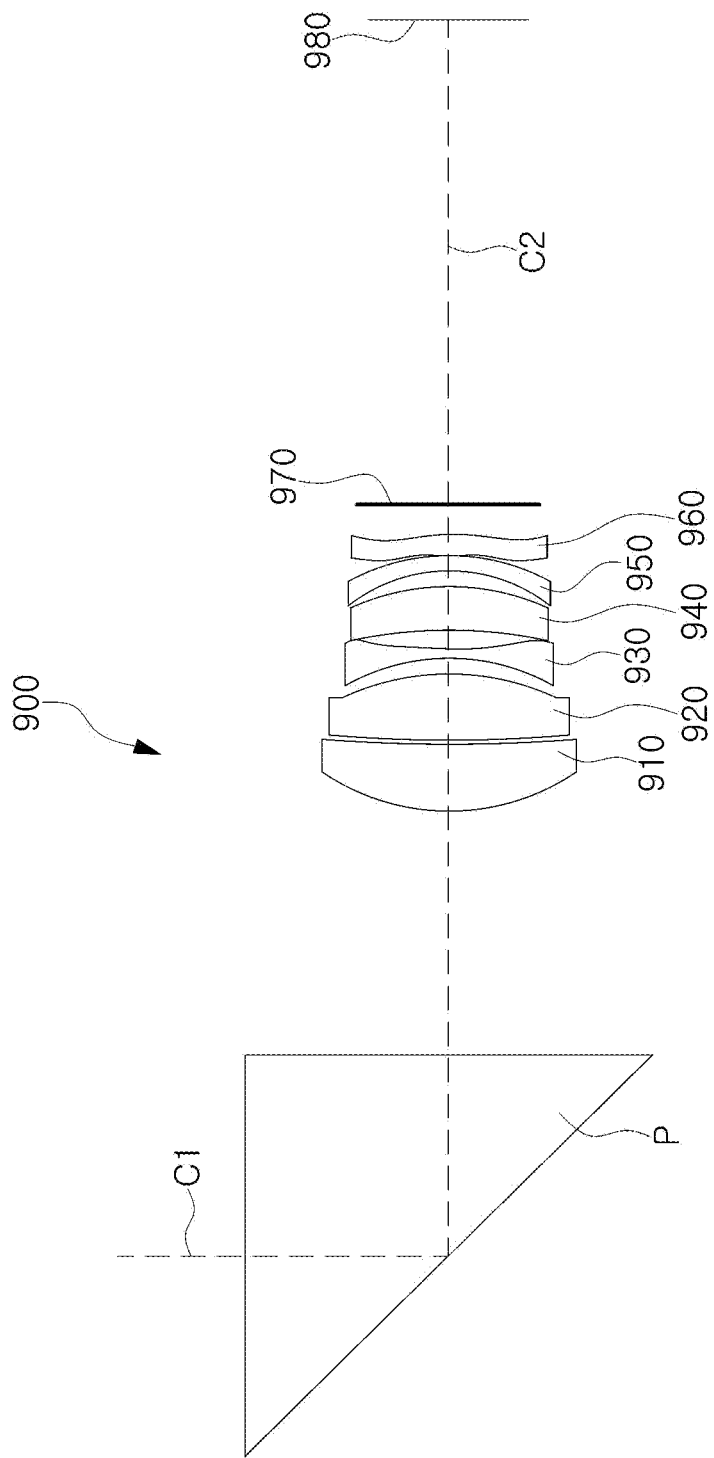
FIG. 17 is a configuration diagram of a ninth example of an optical imaging system.
Figure 18:
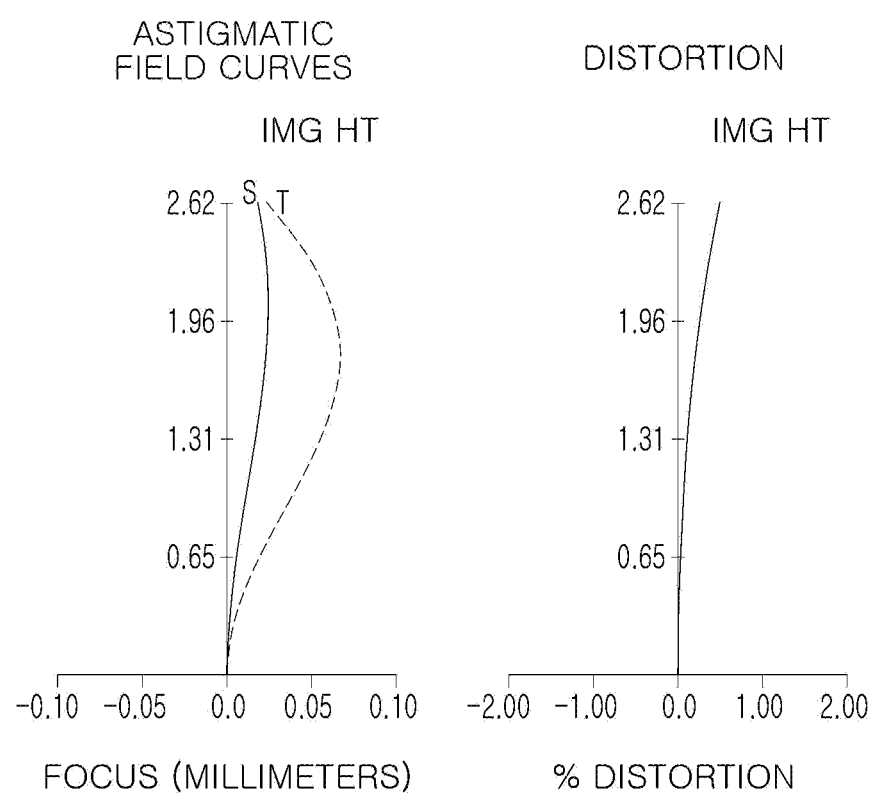
FIG. 18 shows aberration curves of the optical imaging system illustrated in FIG. 17.

FIG. 17 is a configuration diagram of an ninth example of an optical imaging system, and FIG. 18 shows aberration curves of the optical imaging system illustrated in FIG. 17.

An optical imaging system 900 includes a first lens 910, a second lens 920, a third lens 930, a fourth lens 940, a fifth lens 950, and a sixth lens 960.

The first lens 910 has a positive refractive power. The first lens 910 has a convex object-side surface and a concave image-side surface. The second lens 920 has a positive refractive power. The second lens 920 has a convex object-side surface and a convex image-side surface. The third lens 930 has a negative refractive power. The third lens 930 has a concave object-side surface and a convex image-side surface. The fourth lens 940 has a positive refractive power. The fourth lens 940 has a convex object-side surface and a convex image-side surface. The fifth lens 950 has a negative refractive power. The fifth lens 950 has a concave object-side surface and a convex image-side surface. The sixth lens 960 has a positive refractive power. The sixth lens 960 has a concave object-side surface and a convex image-side surface.

The optical imaging system 900 includes a prism P, a filter 970, and an image sensor 980.

The optical imaging system 900 includes the prism P as a means for folding an optical path of light in the optical imaging system 900. The prism P folds a first optical axis C1 to form a second optical axis C2. The second optical axis C2 is substantially perpendicular to the first optical axis C1. The prism P is disposed on the object side of the first lens 910, and reflects light reflected from an object (a subject) to the image sensor 980.

The filter 970 is disposed in front of the image sensor 980, and blocks infrared rays included in incident light. The image sensor 980 includes a plurality of optical sensors, and is configured to convert an optical signal into an electrical signal.

Table 17 below illustrates optical characteristics of the elements of the optical imaging system 900, and Table 18 below illustrates aspherical surface coefficients of the lenses of the optical imaging system 900.

TABLE 17

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | Prism | Infinity | 8.000 | 1.519 | 64.2 | | |
| 2 | | Infinity | 8.000 | 1.519 | 64.2 | | |
| 3 | | Infinity | 11.000 | | | | |
| 4 | First | 8.01 | 2.630 | 1.537 | 55.7 | 4.700 | 4.577 |
| 5 | Lens | 62.72 | 0.153 | | | 4.430 | 4.313 |
| 6 | Second | 58.22 | 2.352 | 1.537 | 55.7 | 4.385 | 4.270 |
| 7 | Lens | −9.30 | 0.611 | | | 4.049 | 3.967 |
| 8 | Third | −4.04 | 0.450 | 1.621 | 26.0 | 3.788 | 3.738 |
| 9 | Lens | −50.44 | 0.590 | | | 3.445 | 3.430 |
| 10 | Fourth | 23.92 | 1.640 | 1.680 | 19.2 | 3.429 | 3.414 |
| 11 | Lens | −15.78 | 0.534 | | | 3.531 | 3.527 |
| 12 | Fifth | −4.42 | 0.600 | 1.642 | 23.9 | 3.500 | 3.500 |
| 13 | Lens | −6.62 | 0.071 | | | 3.646 | 3.624 |
| 14 | Sixth | −8.26 | 0.700 | 1.571 | 37.4 | 3.524 | 3.468 |
| 15 | Lens | −7.94 | 1.020 | | | 3.427 | 3.338 |
| 16 | Filter | Infinity | 0.110 | 1.519 | 64.2 | | |
| 17 | | | 28.749 | | | | |
| 18 | Imaging Plane | | 0.000 | | | | |

TABLE 18

| Surface Number | k | A | B | C | D | E | F | G | H | J |
|---|---|---|---|---|---|---|---|---|---|---|
| 4 | −8.9E−01 | 1.5E−04 | 7.2E−05 | −1.7E−05 | 2.6E−06 | −2.5E−07 | 1.5E−08 | −5.5E−10 | 1.1E−11 | −9.7E−14 |
| 5 | 0.0E+00 | −2.4E−05 | 2.6E−05 | −1.4E−05 | 3.8E−06 | −5.6E−07 | 4.7E−08 | −2.2E−09 | 5.5E−11 | −5.4E−13 |
| 6 | 0.0E+00 | −2.5E−05 | −1.8E−07 | 6.0E−06 | −2.0E−06 | 3.1E−07 | −2.7E−08 | 1.3E−09 | −3.7E−11 | 4.4E−13 |
| 7 | 0.0E+00 | −4.1E−03 | 2.5E−03 | −6.1E−04 | 8.4E−05 | −6.7E−06 | 3.0E−07 | −5.5E−09 | −4.2E−11 | 2.3E−12 |
| 8 | 0.0E+00 | 7.8E−03 | 1.0E−03 | −2.3E−04 | −3.9E−05 | 1.8E−05 | −2.6E−06 | 1.8E−07 | −6.7E−09 | 1.0E−10 |
| 9 | 0.0E+00 | 1.2E−02 | −5.9E−03 | 2.2E−03 | −4.8E−04 | 5.8E−05 | −3.4E−06 | 2.9E−08 | 5.7E−09 | −1.9E−10 |
| 10 | 0.0E+00 | 6.0E−04 | −3.7E−03 | 1.2E−03 | −1.4E−04 | −1.1E−05 | 4.8E−06 | −5.2E−07 | 2.6E−08 | −5.1E−10 |
| 11 | 0.0E+00 | −9.5E−03 | 1.7E−03 | −3.0E−04 | 9.1E−05 | −2.3E−05 | 3.3E−06 | −2.5E−07 | 9.4E−09 | −1.4E−10 |
| 12 | 0.0E+00 | −7.5E−03 | 6.0E−03 | −1.8E−03 | 3.8E−04 | −5.7E−05 | 5.9E−06 | −3.9E−07 | 1.5E−08 | −2.3E−10 |
| 13 | 0.0E+00 | 1.8E−03 | −7.2E−04 | 5.7E−04 | −2.3E−04 | 4.7E−05 | −5.4E−06 | 3.6E−07 | −1.3E−08 | 1.9E−10 |
| 14 | 0.0E+00 | 4.2E−03 | −3.3E−03 | 1.9E−03 | −5.2E−04 | 8.2E−05 | −7.8E−06 | 4.4E−07 | −1.4E−08 | 1.9E−10 |
| 15 | 0.0E+00 | 2.8E−03 | 4.2E−04 | 4.5E−05 | 1.8E−05 | −1.4E−05 | 2.7E−06 | −2.5E−07 | 1.1E−08 | −2.0E−10 |

Figure 19:
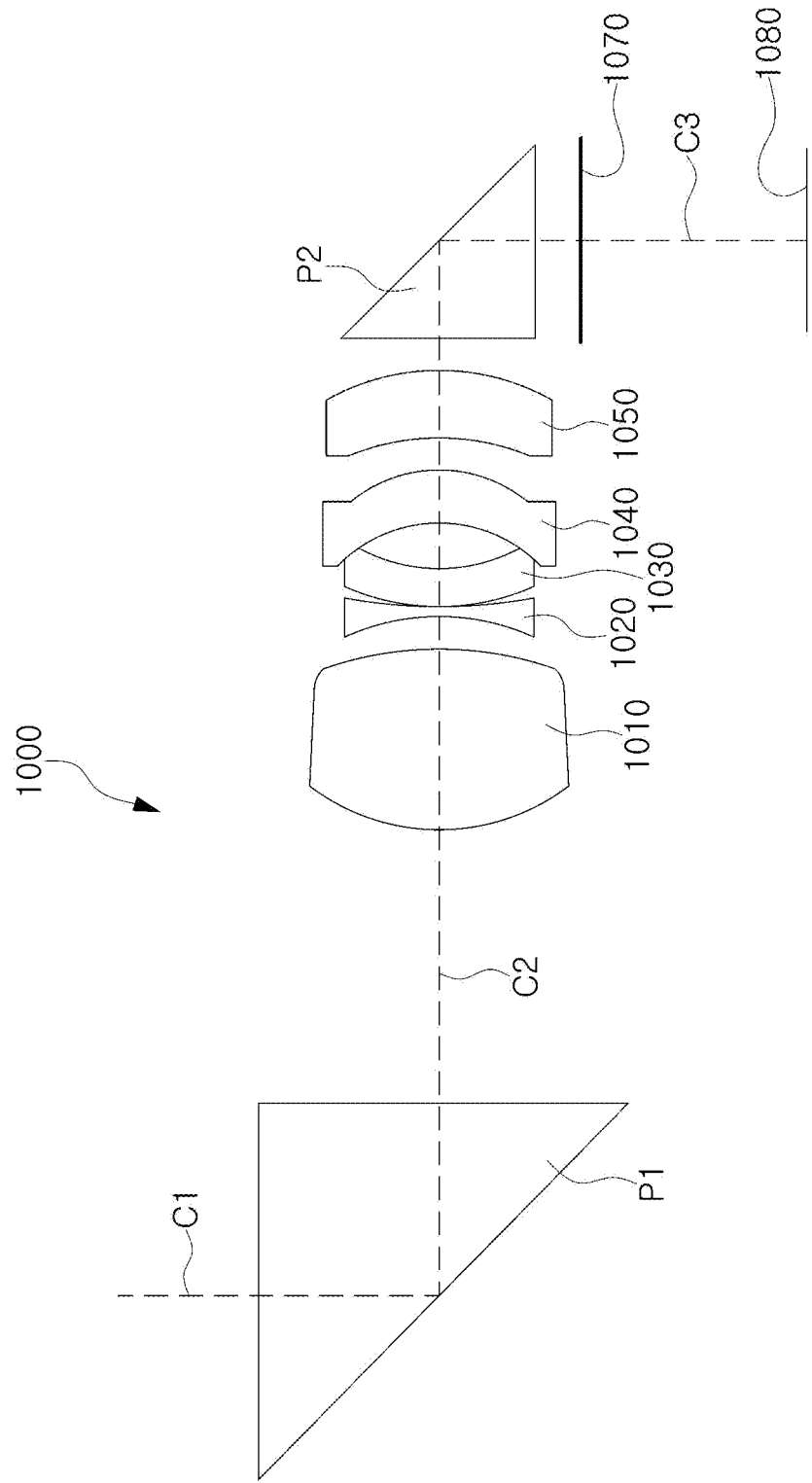
FIG. 19 is a configuration diagram of a tenth example of an optical imaging system.
Figure 20:
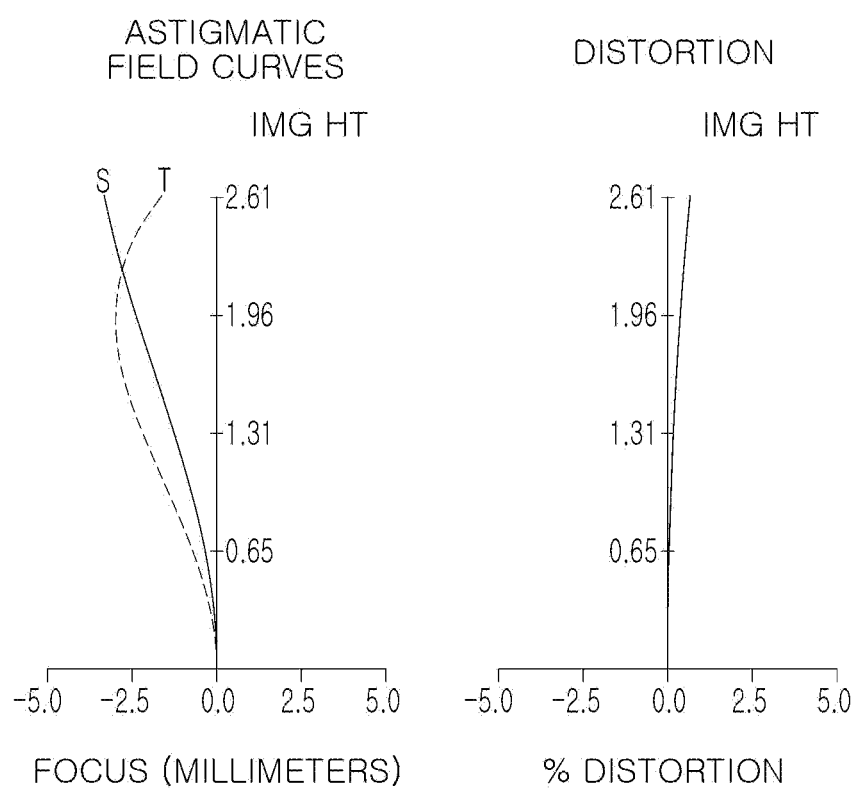
FIG. 20 shows aberration curves of the optical imaging system illustrated in FIG. 19.

FIG. 19 is a configuration diagram of a tenth example of an optical imaging system, and FIG. 20 shows aberration curves of the optical imaging system illustrated in FIG. 19.

An optical imaging system 1000 includes a first lens 1010, a second lens 1020, a third lens 1030, a fourth lens 1040, and a fifth lens 1050.

The first lens 1010 has a positive refractive power. The first lens 1010 has a convex object-side surface and a convex image-side surface. The second lens 1020 has a negative refractive power. The second lens 1020 has a concave object-side surface and a concave image-side surface. The third lens 1030 has a negative refractive power. The third lens 1030 has a convex object-side surface and a concave image-side surface. The fourth lens 1040 has a positive refractive power. The fourth lens 1040 has a concave object-side surface and a convex image-side surface. The fifth lens 1050 has a negative refractive power. The fifth lens 1050 has a concave object-side surface and a convex image-side surface.

The optical imaging system 1000 further includes a first prism P1, a filter 1070, a second prism P2, and an image sensor 1080.

The optical imaging system 1000 includes the first prism P1 as a means for folding an optical path of light in the optical imaging system 1000. The first prism P1 folds a first optical axis C1 to form a second optical axis C2. The second optical axis C2 is substantially perpendicular to the first optical axis C1. The first prism P1 is disposed on the object side of the first lens 1010, and reflects light reflected from an object (a subject) to the second prism P2.

The optical imaging system 1000 includes the second prism P2 as another means for folding the optical path of light in the optical imaging system 1000. The second prism P2 folds the second optical axis C2 to form a third optical axis C3. The third optical axis C3 is substantially perpendicular to the second optical axis C2. The second prism P2 is disposed between the fifth lens 1050 and the image sensor 1080, and reflects light reflected by the first prism P1 to the image sensor 1080.

The filter 1070 is disposed in front of the image sensor 1080, and blocks infrared rays included in incident light. The image sensor 1080 includes a plurality of optical sensors, and is configured to convert an optical signal into an electrical signal.

Table 19 below illustrates optical characteristics of the elements of the optical imaging system 1000, and Table 20 below illustrates aspherical surface coefficients of the optical imaging system 1000.

TABLE 19

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | First | Infinity | 6.000 | 1.519 | 64.2 | | |
| 2 | Prism | Infinity | 6.000 | 1.519 | 64.2 | | |
| 3 | | Infinity | 9.000 | | | | |
| 4 | First | 7.12 | 6.000 | 1.536 | 23.9 | 4.400 | 4.338 |
| 5 | Lens | −10.60 | 1.027 | | | 3.542 | 3.494 |
| 6 | Second | −4.37 | 0.450 | 1.621 | 55.7 | 3.135 | 3.035 |
| 7 | Lens | 43.64 | 0.029 | | | 2.898 | 2.767 |
| 8 | Third | 5.19 | 1.199 | 1.621 | 26.0 | 2.872 | 2.730 |
| 9 | Lens | 4.39 | 1.524 | | | 2.620 | 2.481 |
| 10 | Fourth | −6.18 | 1.731 | 1.621 | 26.0 | 3.500 | 2.471 |
| 11 | Lens | −4.33 | 1.120 | | | 3.013 | 2.788 |
| 12 | Fifth | −7.13 | 2.211 | 1.571 | 26.0 | 3.082 | 2.685 |
| 13 | Lens | −8.89 | 1.020 | | | 3.417 | 2.905 |
| 14 | Stop | Infinity | 0.000 | | | | |
| 15 | Second | Infinity | 3.200 | 1.519 | 64.2 | | |
| 16 | Prism | Infinity | 3.200 | 1.519 | 64.2 | | |
| 17 | | Infinity | 1.500 | | | | |
| 18 | Filter | Infinity | 0.110 | 1.519 | 64.2 | | |
| 19 | | Infinity | 7.511 | | | | |
| 20 | Imaging Plane | infinity | 0.000 | | | | |

TABLE 20

| Surface Number | k | A | B | C | D | E | F | G | H | J |
|---|---|---|---|---|---|---|---|---|---|---|
| 4 | −9.50E−01 | −3.27E−05 | 1.81E−04 | −3.65E−05 | 4.25E−06 | −2.97E−07 | 1.19E−08 | −2.39E−10 | 1.02E−12 | 2.44E−14 |
| 5 | 0.00E+00 | −3.82E−03 | 4.37E−03 | −1.70E−03 | 3.86E−04 | −5.58E−05 | 5.23E−06 | −3.07E−07 | 1.02E−08 | −1.49E−10 |
| 6 | 0.00E+00 | 7.44E−04 | 1.35E−02 | −7.88E−03 | 2.44E−03 | −4.67E−04 | 5.74E−05 | −4.41E−06 | 1.94E−07 | −3.73E−09 |
| 7 | 0.00E+00 | −3.49E−03 | 2.35E−02 | −1.99E−02 | 8.98E−03 | −2.46E−03 | 4.20E−04 | −4.35E−05 | 2.50E−06 | −6.10E−08 |
| 8 | 0.00E+00 | −2.25E−02 | 3.41E−02 | −2.84E−02 | 1.34E−02 | −3.83E−03 | 6.71E−04 | −7.05E−05 | 4.07E−06 | −9.93E−08 |
| 9 | 0.00E+00 | −3.01E−02 | 3.48E−02 | −2.91E−02 | 1.51E−02 | −4.91E−03 | 9.93E−04 | −1.21E−04 | 8.17E−06 | −2.33E−07 |
| 10 | 0.00E+00 | 3.24E−03 | −4.19E−03 | 8.80E−04 | −5.91E−05 | −1.01E−05 | 2.94E−06 | −3.13E−07 | 1.60E−08 | −3.22E−10 |
| 11 | 0.00E+00 | 1.57E−02 | −7.16E−03 | 1.94E−03 | −4.34E−04 | 9.15E−05 | −1.51E−05 | 1.61E−06 | −9.57E−08 | 2.39E−09 |
| 12 | 0.00E+00 | 1.31E−02 | −6.03E−03 | 8.79E−04 | 1.42E−04 | −8.15E−05 | 1.53E−05 | −1.54E−06 | 8.37E−08 | −1.91E−09 |
| 13 | 0.00E+00 | 1.95E−03 | −1.66E−03 | 4.82E−04 | −8.88E−05 | 1.10E−05 | −8.85E−07 | 4.15E−08 | −8.33E−10 | −6.42E−13 |

Figure 21:
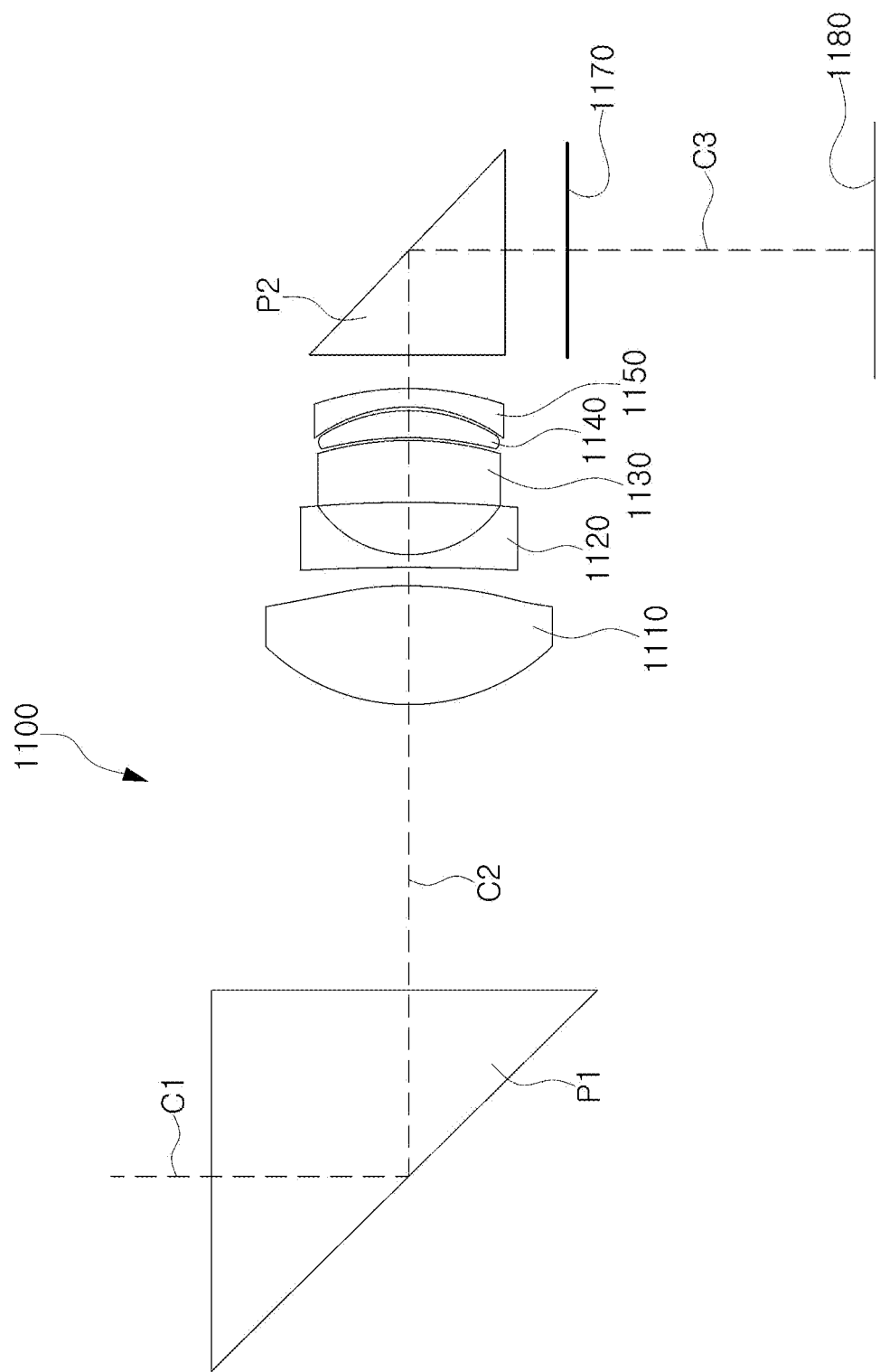
FIG. 21 is a configuration diagram of an eleventh example of an optical imaging system.
Figure 22:
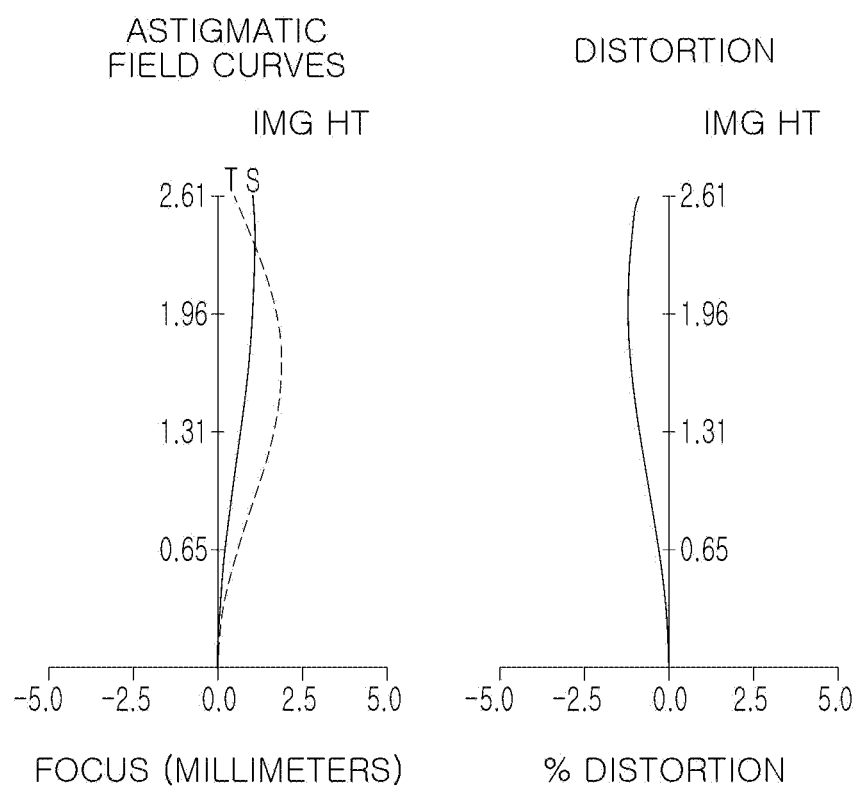
FIG. 22 shows aberration curves of the optical imaging system illustrated in FIG. 21.

FIG. 21 is a configuration diagram of an eleventh example of an optical imaging system, and FIG. 22 shows aberration curves of the optical imaging system illustrated in FIG. 21.

An optical imaging system 1100 includes a first lens 1110, a second lens 1120, a third lens 1130, a fourth lens 1140, and a fifth lens 1150.

The first lens 1110 has a positive refractive power. The first lens 1110 has a convex object-side surface and a convex image-side surface. The second lens 1120 has a negative refractive power. The second lens 1120 has a convex object-side surface and a concave image-side surface. The third lens 1130 has a negative refractive power. The third lens 1130 has a convex object-side surface and a concave image-side surface. The fourth lens 1140 has a positive refractive power. The fourth lens 1140 has a concave object-side surface and a convex image-side surface. The fifth lens 1150 has a negative refractive power. The fifth lens 1150 has a concave object-side surface and a convex image-side surface.

The optical imaging system 1100 further includes a first prism P1, a filter 1170, a second prism P2, and an image sensor 1180.

The optical imaging system 1100 includes the first prism P1 as a means for folding an optical path of light in the optical imaging system 1100. The first prism P1 folds a first optical axis C1 to form a second optical axis C2. The second optical axis C2 is substantially perpendicular to the first optical axis C1. The first prism P1 is disposed on the object side of the first lens 1110, and reflects light reflected from an object (a subject) to the second prism P2.

The optical imaging system 1100 includes the second prism P2 as another means for folding the optical path of light in the optical imaging system 1100. The second prism P2 folds the second optical axis C2 to form a third optical axis C3. The third optical axis C3 is substantially perpendicular to the second optical axis C2. The second prism P2 is disposed between the fifth lens 1150 and the image sensor 1180, and reflects light reflected by the first prism P1 to the image sensor 1180.

The filter 1170 is disposed in front of the image sensor 1180, and blocks infrared rays included in incident light. The image sensor 1180 includes a plurality of optical sensors, and is configured to convert an optical signal into an electrical signal.

Table 21 below illustrates optical characteristics of the elements of the optical imaging system 1100, and Table 22 below illustrates aspherical surface coefficients of the optical imaging system 1100.

TABLE 21

| Surface Number | Element | Radius of Curvature | Thickness/ Distance | Refractive Index | Abbe Number | Long Axis Effective Radius | Short Axis Effective Radius |
|---|---|---|---|---|---|---|---|
| 0 | Object | Infinity | Infinity | | | | |
| 1 | First | | 6.000 | 1.519 | 64.2 | | |
| 2 | Prism | | 6.000 | 1.519 | 64.2 | | |
| 3 | | | 9.000 | | | | |
| 4 | First | 5.74 | 3.685 | 1.530 | 23.9 | 4.500 | 4.070 |
| 5 | Lens | −12.21 | 0.516 | | | 4.490 | 3.707 |
| 6 | Second | 20.70 | 0.450 | 1.620 | 55.7 | 3.414 | 3.160 |
| 7 | Lens | 3.61 | 1.603 | | | 2.895 | 2.755 |
| 8 | Third | 87.90 | 1.987 | 1.679 | 26.0 | 2.861 | 2.698 |
| 9 | Lens | 76.43 | 0.311 | | | 2.848 | 2.761 |
| 10 | Fourth | −6.50 | 0.643 | 1.640 | 26.0 | 2.746 | 2.757 |
| 11 | Lens | −4.79 | 0.157 | | | 2.840 | 2.768 |
| 12 | Fifth | −3.79 | 0.600 | 1.570 | 26.0 | 2.807 | 2.732 |
| 13 | Lens | −5.12 | 1.020 | | | 2.892 | 2.764 |
| 14 | Stop | Infinity | 0.000 | | | | |
| 15 | Second | Infinity | 3.200 | 1.519 | 64.2 | | |
| 16 | Prism | Infinity | 3.200 | 1.519 | 64.2 | | |
| 17 | | Infinity | 2.000 | | | | |
| 18 | Filter | Infinity | 0.110 | | | | |
| 19 | | Infinity | 9.626 | | | | |
| 20 | Imaging Plane | infinity | 0.000 | | | | |

TABLE 22

| Surface Number | k | A | B | C | D | E | F | G | H | J |
|---|---|---|---|---|---|---|---|---|---|---|
| 4 | −1.13E+00 | −1.46E−03 | 8.62E−04 | −2.16E−04 | 3.25E−05 | −3.03E−06 | 1.76E−07 | −6.20E−09 | 1.21E−10 | −9.98E−13 |
| 5 | 0.00E+00 | 2.25E−03 | −7.70E−04 | 1.64E−04 | −2.28E−05 | 2.10E−06 | −1.23E−07 | 4.38E−09 | −8.64E−11 | 7.20E−13 |
| 6 | 0.00E+00 | −3.14E−03 | 1.40E−03 | −8.96E−04 | 2.28E−04 | −3.06E−05 | 2.42E−06 | −1.13E−07 | 2.87E−09 | −3.06E−11 |
| 7 | 0.00E+00 | −1.32E−02 | 9.70E−03 | −5.40E−03 | 1.61E−03 | −2.79E−04 | 2.91E−05 | −1.79E−06 | 5.98E−08 | −8.41E−10 |
| 8 | 0.00E+00 | −1.49E−03 | −7.66E−03 | 3.86E−03 | −8.58E−04 | 1.03E−04 | −7.28E−06 | 3.13E−07 | −8.56E−09 | 1.28E−10 |
| 9 | 0.00E+00 | 3.89E−03 | −1.49E−02 | 6.20E−03 | −9.94E−04 | 2.29E−05 | 1.36E−05 | −1.90E−06 | 1.04E−07 | −2.11E−09 |
| 10 | 0.00E+00 | 2.49E−03 | 5.96E−03 | −4.74E−03 | 1.72E−03 | −3.38E−04 | 3.83E−05 | −2.49E−06 | 8.63E−08 | −1.23E−09 |
| 11 | 0.00E+00 | −2.29E−02 | 1.97E−02 | −7.86E−03 | 1.90E−03 | −2.94E−04 | 2.87E−05 | −1.71E−06 | 5.64E−08 | −7.81E−10 |
| 12 | 0.00E+00 | 2.31E−02 | −3.01E−02 | 1.82E−02 | −5.60E−03 | 9.96E−04 | −1.06E−04 | 6.69E−06 | −2.30E−07 | 3.33E−09 |
| 13 | 0.00E+00 | 3.84E−02 | −3.11E−02 | 1.59E−02 | −4.74E−03 | 8.62E−04 | −9.69E−05 | 6.56E−06 | −2.45E−07 | 3.87E−09 |

Table 23 below illustrates optical characteristics of the first to eleventh examples of the optical imaging system. In Table 23, f1 is the focal length of the first lens, f2 is the focal length of the second lens, f3 is the focal length of the third lens, f4 is the focal length of the fourth lens, f5 is the focal length of the fifth lens, and f6 is the focal length of the sixth lens. f, BFL, TTL, and PTTL have already been defined above.

TABLE 23

| Example | f | f1 | f2 | f3 | f4 | f5 | f6 | BFL | TTL | PTTL |
|---|---|---|---|---|---|---|---|---|---|---|
| First Example | 30.19 | 11.46 | −9.26 | 13.40 | −10.15 | 18.35 | | 19.434 | 30.186 | 45.185 |
| Second Example | 29.80 | 9.81 | −7.66 | 12.13 | −11.77 | 27.40 | | 19.826 | 29.450 | 44.450 |
| Third Example | 31.46 | 8.77 | −7.04 | 14.07 | −28.97 | −160.44 | | 20.139 | 29.909 | 44.909 |
| Fourth Example | 29.80 | 8.73 | −7.48 | 15.74 | −33.80 | −172.20 | | 20.604 | 29.711 | 44.711 |
| Fifth Example | 46.50 | 13.07 | −11.03 | 20.30 | −34.20 | 710.10 | | 34.031 | 46.182 | 65.182 |
| Sixth Example | 46.50 | 15.95 | −12.98 | 18.33 | −16.51 | 35.04 | | 35.216 | 47.207 | 66.206 |
| Seventh Example | 47.75 | 13.33 | −10.64 | 20.80 | −45.20 | −222.71 | | 32.002 | 45.598 | 64.598 |
| Eighth Example | 47.00 | 13.35 | −10.81 | 20.87 | −40.91 | −306.79 | | 29.879 | 45.816 | 64.816 |
| Ninth Example | 29.50 | 16.82 | 15.13 | −7.11 | 14.23 | −23.25 | 200.05 | 29.879 | 40.210 | 59.21 |

TABLE 23-continued

| Example | f | f1 | f2 | f3 | f4 | f5 | f6 | BFL | TTL | PTTL |
|---|---|---|---|---|---|---|---|---|---|---|
| Tenth Example | 29.50 | 9.01 | −6.37 | −109.62 | 17.12 | −116.17 | | 16.541 | 31.541 | 46.832 |
| Eleventh Example | 29.50 | 7.93 | −7.14 | −928.06 | 24.73 | −30.49 | | 19.156 | 29.108 | 44.108 |

Tables 24 and 25 below illustrate values of Conditional Expressions 1 to 9 for the first to eleventh examples of the optical imaging system. As can be seen from Tables 24 and 25, the first to eleventh examples of the optical imaging system satisfy all of Conditional Expressions 1 and 2 to 9 except that the sixth example does not satisfy Conditional Expression 7 ($0.8 \leq TTL/f \leq 1.0$), and the eleventh example does not satisfy Conditional Expression 9 ($0.2 \leq L1R1/f \leq 0.3$).

TABLE 24

| Conditional Expression | First Example | Second Example | Third Example | Fourth Example | Fifth Example | Sixth Example |
|---|---|---|---|---|---|---|
| f-number | 2.9600 | 2.9600 | 3.2900 | 3.3800 | 3.4400 | 3.3900 |
| Nd2 + Nd3 | 3.3001 | 3.3001 | 3.3001 | 3.3001 | 3.3001 | 3.3001 |
| f1 + f2 | 2.2086 | 2.1510 | 1.7275 | 1.2541 | 2.0377 | 2.97 |
| D12/f | 0.0130 | 0.0149 | 0.0164 | 0.0218 | 0.0310 | 0.0210 |
| L1R2eMax/IMG_HT | 1.8129 | 1.8129 | 1.8129 | 1.5231 | 1.6529 | 1.844 |
| L1R2eMax/L1R1eMax | 0.8826 | 0.8826 | 0.8826 | 0.9066 | 0.9655 | 0.9838 |
| TTL/f | 1.0000 | 0.9882 | 0.9507 | 0.9970 | 0.9932 | 1.0152 |
| TTL/IMG_HT | 11.526 | 11.245 | 11.420 | 11.345 | 11.546 | 11.802 |
| L1R1/f | 0.2225 | 0.2377 | 0.2205 | 0.2635 | 0.2900 | 0.2382 |

TABLE 25

| Conditional Expression | Seventh Example | Eighth Example | Ninth Example | Tenth Example | Eleventh Example |
|---|---|---|---|---|---|
| f-number | 3.2300 | 3.3500 | 3.1300 | 3.3500 | 3.2700 |
| Nd2 + Nd3 | 3.3001 | 3.3001 | 3.1572 | 3.2412 | 3.2990 |
| f1 + f2 | 2.6851 | 2.5450 | 31.9476 | 2.6300 | 0.7200 |
| D12/f | 0.0106 | 0.0228 | 0.0052 | 0.0348 | 0.0175 |
| L1R2eMax/IMG_HT | 1.791 | 1.5913 | 1.6915 | 1.3524 | 1.7144 |
| L1R2eMax/L1R1eMax | 0.9284 | 0.9093 | 0.9425 | 0.8050 | 0.9978 |
| TTL/f | 0.9549 | 0.9549 | 1.3631 | 1.0692 | 0.9867 |
| TTL/IMG_HT | 11.400 | 11.454 | 15.3532 | 12.0432 | 11.1142 |
| L1R1/f | 0.2208 | 0.2707 | 0.2714 | 0.2414 | 0.1947 |

Table 26 below illustrates other optical characteristics of the first to eleventh examples of the optical imaging system.

TABLE 26

| Example | IMG_HT | FOV | 2θ | AL1 |
|---|---|---|---|---|
| First Example | 2.619 | 9.92 | 24.167 | 88.140 |
| Second Example | 2.619 | 10.00 | 27.713 | 86.767 |
| Third Example | 2.619 | 9.40 | 31.050 | 85.143 |
| Fourth Example | 2.619 | 10.00 | 5.849 | 60.794 |
| Fifth Example | 4 | 9.80 | 19.297 | 145.075 |
| Sixth Example | 4 | 9.70 | 25.194 | 170.451 |
| Seventh Example | 4 | 9.50 | 24.208 | 181.312 |
| Eighth Example | 4 | 9.70 | 15.310 | 152.709 |
| Ninth Example | 2.619 | 10.10 | 45.573 | 56.343 |
| Tenth Example | 2.619 | 10.10 | 9.650 | 60.699 |
| Eleventh Example | 2.619 | 10.10 | 25.264 | 61.391 |

Tables 27 and 28 below illustrate values of Conditional Expressions 10 to 14, 16-23, and 25 for the first to eleventh examples of the optical imaging system.

TABLE 27

| Example | L1S1es/ L1S1el | L1S2es/ L1S2el | L2S1es/ L2S1el | L2S2es/ L2S2el | DPL1 | SPY2/SPX2 | L1S1el/IMG_HT |
|---|---|---|---|---|---|---|---|
| First Example | 0.912 | 0.927 | 0.950 | 0.970 | 9.000 | 0.950 | 2.054 |
| Second Example | 0.885 | 0.914 | 0.911 | 0.932 | 9.000 | 0.911 | 2.054 |
| Third Example | 0.857 | 0.911 | 0.886 | 0.920 | 9.000 | 0.886 | 2.054 |
| Fourth Example | 0.995 | 0.996 | 0.998 | 0.700 | 9.000 | 0.998 | 1.680 |
| Fifth Example | 0.944 | 0.949 | 0.972 | 0.984 | 11.000 | 0.972 | 1.713 |
| Sixth Example | 0.905 | 0.898 | 0.908 | 0.954 | 11.000 | 0.908 | 1.874 |
| Seventh Example | 0.912 | 0.916 | 0.941 | 0.968 | 11.000 | 0.941 | 1.929 |
| Eighth Example | 0.965 | 0.968 | 0.978 | 0.992 | 11.000 | 0.978 | 1.750 |
| Ninth Example | 0.974 | 0.974 | 0.974 | 0.980 | 9.000 | 0.986 | 1.795 |
| Tenth Example | 0.986 | 0.986 | 0.968 | 0.955 | 9.000 | 0.968 | 1.680 |
| Eleventh Example | 0.904 | 0.826 | 0.926 | 0.951 | 9.000 | 0.926 | 1.718 |

TABLE 28

| Element | L1S1el/ PTTL | L1S1es/ PTTL | L2S1el/ PTTL | L2S1es/ PTTL | AD1/(PTTL)2 | 2θ/FOV | BFL/2IMG_HT |
|---|---|---|---|---|---|---|---|
| First Example | 0.115 | 0.105 | 0.094 | 0.089 | 0.040 | 2.436 | 3.710 |
| Second Example | 0.117 | 0.104 | 0.095 | 0.087 | 0.041 | 2.771 | 3.785 |
| Third Example | 0.116 | 0.099 | 0.094 | 0.084 | 0.040 | 3.303 | 3.845 |
| Fourth Example | 0.095 | 0.095 | 0.081 | 0.081 | 0.028 | 0.585 | 3.934 |
| Fifth Example | 0.104 | 0.098 | 0.091 | 0.088 | 0.033 | 1.969 | 4.254 |
| Sixth Example | 0.112 | 0.101 | 0.101 | 0.092 | 0.038 | 2.597 | 4.402 |
| Seventh Example | 0.118 | 0.107 | 0.098 | 0.092 | 0.042 | 2.548 | 4.000 |
| Eighth Example | 0.106 | 0.103 | 0.089 | 0.087 | 0.035 | 1.578 | 3.735 |
| Ninth Example | 0.079 | 0.077 | 0.074 | 0.072 | 0.027 | 4.512 | 3.645 |
| Tenth Example | 0.096 | 0.094 | 0.068 | 0.066 | 0.029 | 0.955 | 2.713 |
| Eleventh Example | 0.104 | 0.094 | 0.079 | 0.073 | 0.033 | 2.501 | 3.213 |

Figure 23:
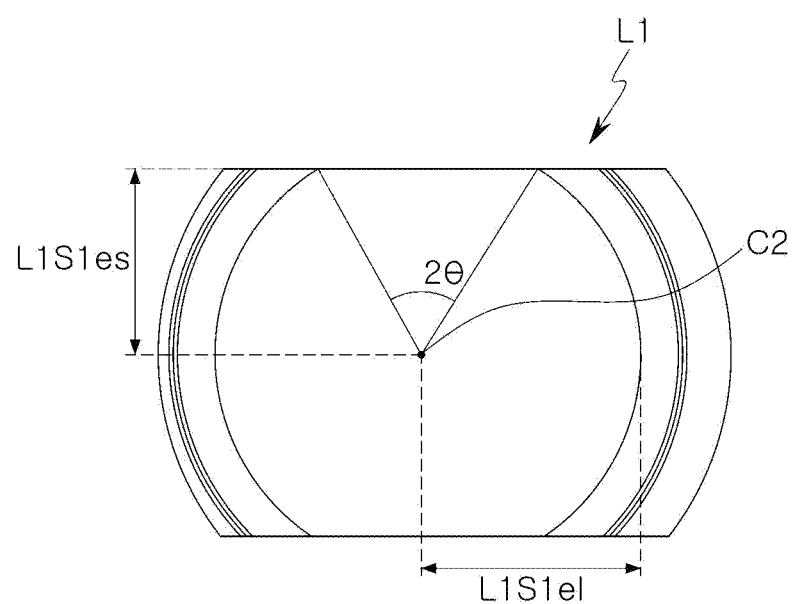
FIG. 23 is a plan view of an example of a first lens in an optical imaging system when viewed in an optical axis direction.
Figure 24:
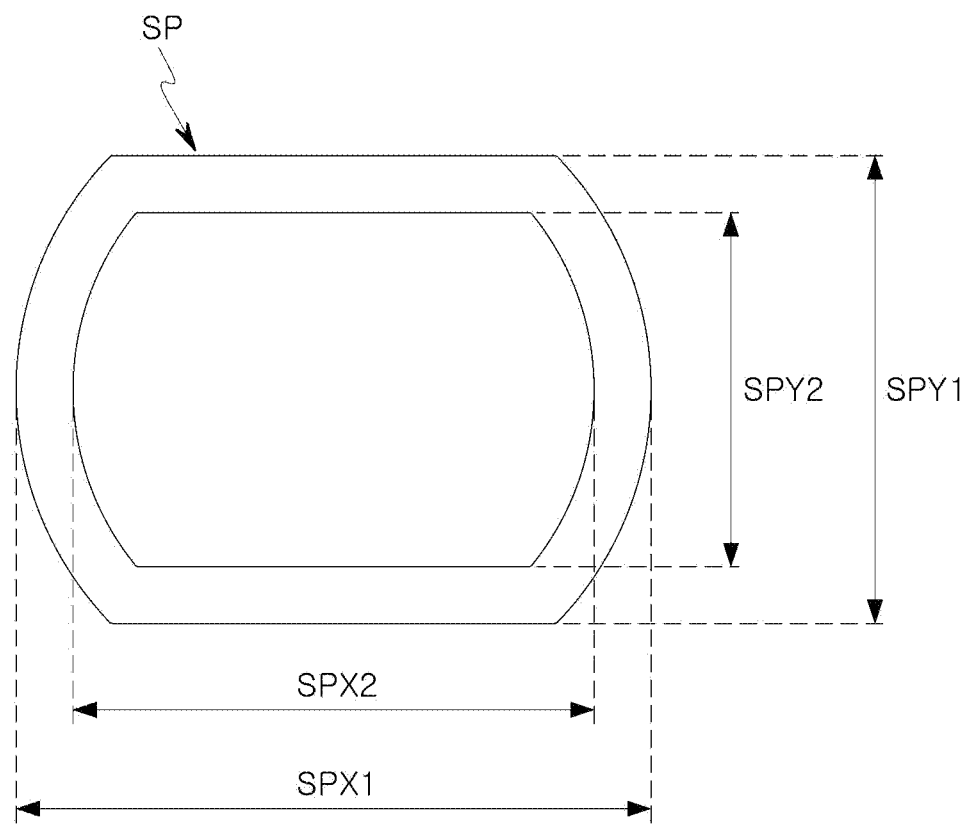
FIG. 24 is a plan view of an example of a gap maintaining member disposed between a first lens and a second lens in an optical imaging system when viewed in an optical axis direction.

FIG. 23 is a plan view of an example of a first lens in an optical imaging system when viewed in an optical axis direction, and FIG. 24 is a plan view of an example of a gap maintaining member disposed between a first lens and a second lens in an optical imaging system when viewed in an optical axis direction.

Referring to FIG. 23, a first lens L1 has a non-circular shape when viewed in an optical axis direction, and includes two arc-shaped side surfaces and two straight-shaped side surfaces parallel to each other and connecting the two arc-shaped side surfaces to each other. FIG. 23 shows an object-side surface of the first lens L1. The first lens L1 may be the first lens of any of the first to eleventh examples of an optical imaging system described above.

The first lens L1 includes an optical portion exhibiting a lens characteristic of the first lens L1 and a flange portion not exhibiting the lens characteristic of the first lens L1 and extending from the optical portion in a direction away from an optical axis C2. The optical portion has two arc-shaped edges, and two straight-shaped edges parallel to each other and connecting the two arc-shaped edges to each other. The flange portion includes one flange portion extending from one of the two arc-shaped edges of the optical portion, and another flange portion extending from the other one of the two arc-shaped edges of the optical portion.

The optical portion of the object-side surface of the first lens L1 has different lengths or effective radiuses in a first direction intersecting the optical axis C2 and parallel to the straight-shaped edges of the optical portion, and a second direction intersecting the optical axis C2 and perpendicular to the first direction. An effective radius L1S1el of the optical portion of the object-side surface of the first lens L1 in the first direction, hereinafter referred to as a long axis effective radius L1S1el, is greater than an effective radius L1S1es of the optical portion of the object-side surface of the first lens L1 in the second direction, hereinafter referred to as a short axis effective radius L1S1es. The long axis effective radius L1S1el is measured from the optical axis C2 to one of the arc-shaped edges of the optical portion, and the short axis effective radius L1S1es is measured from the optical axis C2 to one of the straight-shaped edges of the optical portion. The short axis effective radius L1S1es is parallel to the first optical axis C1 in any of any of the first to eleventh examples of an optical imaging system described above.

The long axis effective radius L1S1el is a maximum effective radius L1R1eMax of the optical portion of the object-side surface of the first lens L1, and the short axis effective radius L1S1es is a minimum effective radius of the optical portion of the object-side surface of the first lens L1.

The straight-shaped edges of the optical portion may be limited to a predetermined size. For example, an angle 20 having a vertex at the optical axis C2 of the first lens L1 and subtended by one of the straight-shaped edges of the optical portion may have a value in a range of 10° to 92°.

An area of the object-side surface of the optical portion of the first lens L1 projected in the optical axis direction onto a plane perpendicular to the optical axis direction is AL1.

Although not shown in FIG. 23, an image-side surface of the optical portion of the first lens L1 has a long axis effective radius L1S2el, which is a maximum effective radius L1R2eMax of the optical portion of the image-side surface of the first lens L1, and a short axis effective radius L1S2es, which is a minimum effective radius of the optical portion of the object-side surface of the first lens L1. The long axis effective radius L1S2el is parallel to the long axis effective radius L1S1el of the optical portion of the object-side surface of the first lens L1, and the short axis effective radius L1S2es is parallel to the short axis effective radius L1S1es of the optical portion of the object-side surface of the first lens L1.

Although only the first lens L1 is shown in FIG. 23, one or more of second to fifth or sixth lenses may have a non-circular shape that is the same as or similar to the non-circular shape of the first lens L1. For example, only the second lens may have a non-circular shape, and the third to fifth or sixth lenses may have a circular shape. Alternatively, all of the second to fifth or sixth lenses may have a non-circular shape. The second to fifth lenses may be the second to fifth lenses of any of the first to eighth, tenth, and eleventh examples of an optical imaging system described above. Alternatively, the second to sixth lenses may be the second to sixth lenses of the ninth example of an optical imaging system described above.

When the second lens has a non-circular shape that is the same as or similar to the non-circular shape of the first lens L1, an object-side surface of an optical portion of the second lens has a long axis effective radius L2S1el, which is a maximum effective radius of the optical portion of the object-side surface of the second lens, and a short axis effective radius L2S1es, which is a minimum effective radius of the optical portion of the object-side surface of the second lens. The long axis effective radius L2S1el is parallel to the long axis effective radius L1S1el of the optical portion of the object-side surface of the first lens L1, and the short axis effective radius L2S1es is parallel to the short axis effective radius L1S1es of the optical portion of the object-side surface of the first lens L1.

Furthermore, an image-side surface of the optical portion of the second lens has a long axis effective radius L2S2el, which is a maximum effective radius of the optical portion of the image-side surface of the second lens, and a short axis effective radius L2S2es, which is a minimum effective radius of the optical portion of the image-side surface of the second lens. The long axis effective radius L2S2el is parallel to the long axis effective radius L1S1el of the optical portion of the object-side surface of the first lens L1, and the short axis effective radius L2S2es is parallel to the short axis effective radius L1S1es of the optical portion of the object-side surface of the first lens.

Referring to FIG. 24, a gap maintaining member SP is disposed between the first lens L1 in FIG. 23 and a second lens (not illustrated) to maintain a spacing between the first lens L1 and the second lens, and has a non-circular shape when viewed in an optical axis direction. In the example illustrated in FIG. 24, the gap maintaining member has a substantially rectangular shape, and includes two arc-shaped outer side surfaces and two straight-shaped outer side surfaces connecting the two arc-shaped outer side surfaces to each other. The two straight-shaped outer side surfaces may be parallel to each other. However, this is just an example, and the gap maintaining member SP may have a different non-circular shape.

A length SPX1 of the gap maintaining member SP in a first direction is greater than a length SPY1 of the gap maintaining member SP in a second direction perpendicular to the first direction. The length SPX1 of the gap maintaining member SP is parallel to the long axis effective radius L1S1el of the optical portion of the object-side surface of the first lens L1, and the length SPY1 of the gap maintaining member SP is parallel to the short axis effective radius L1S1es of the optical portion of the object-side surface of the first lens L1.

A hole is formed in the gap maintaining member SP. The hole has a shape having a long axis and a short axis. For example, the hole may have the shape of an ellipse, a rectangle with rounded corners, or any other shape that has a long axis and a short axis. A shape and a size of the hole may be substantially the same as or similar to a shape and a size of the optical portion of the first lens L1 in FIG. 23. The hole includes two arc-shaped sides and two straight-shaped sides connecting the two arc-shaped sides to each other. The two straight-shaped sides may be parallel to each other.

A length SPX2 of the hole n the first direction greater than a length SPY2 of the hole in the second direction. The length SPX2 of the hole is parallel to both the length SPX1 of the gap maintaining member SP and the long axis effective radius L1S1el of the optical portion of the object-side surface of the first lens L1, and the length SPY2 of the hole is parallel to both the length SPY1 of the gap maintaining member SP and the short axis effective radius L1S1es of the optical portion of the object-side surface of the first lens L1.

FIGS. 25 to 28 are rear views of examples of a portable electronic device equipped with a plurality of optical imaging systems.

Referring to FIGS. 25 to 28, a portable electronic device 10 is equipped with a rear-facing telephoto optical imaging system 20 having a long focal length, which may be any of the optical imaging systems 100, 200, 300, 400, 500, 600, 700, 800, 900, 1000, and 1100 described in this application, and includes the first lens L1 in FIG. 23 and the gap maintaining member SP in FIG. 24.

Figure 25:
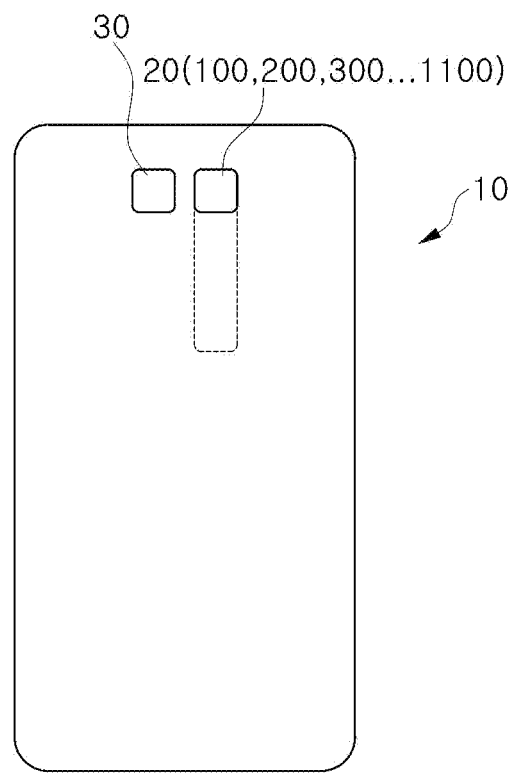
FIGS. 25 to 28 are rear views of a portable electronic device equipped with a plurality of optical imaging systems.

Referring to FIG. 25, in addition to the telephoto optical imaging system 20, the portable electronic terminal 10 may be further equipped with a rear-facing first wide-angle optical imaging system 30 having a first short focal length shorter than the long focal length of the telephoto optical imaging system 20.

Figure 26:
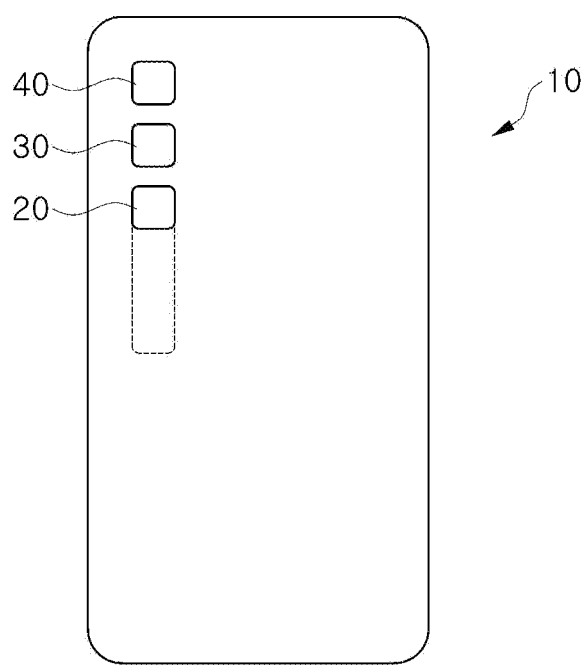

Referring to FIG. 26, in addition to the telephoto optical imaging system 20 and the first wide-angle optical imaging system 30, the portable electronic terminal 10 may be further equipped with a rear-facing second wide-angle optical imaging system 40 having a second short focal length shorter than the long focal length of the telephoto optical imaging system 20 and different from the first short focal length of the first wide-angle optical imaging system 30.

Figure 27:
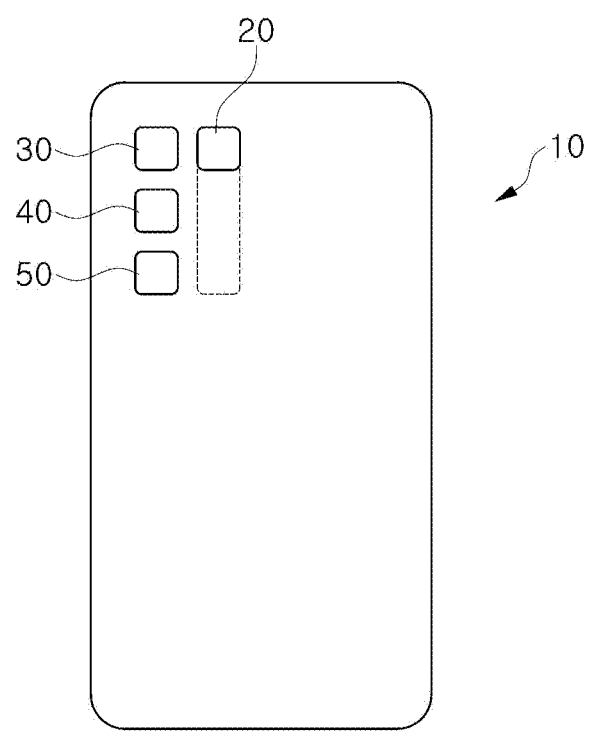

Referring to FIG. 27, in addition to the telephoto optical imaging system 20, the first wide-angle optical imaging system 30, and the second wide-angle optical imaging system 40, the portable electronic terminal 10 may be further equipped with a rear-facing third wide-angle optical imaging system 50 having a third short focal length shorter than the long focal length of the telephoto optical imaging system 20, different from the first short focal length of the first wide-angle optical imaging system 30, and different from the second short focal length of the second wide-angle optical imaging system 40.

Figure 28:
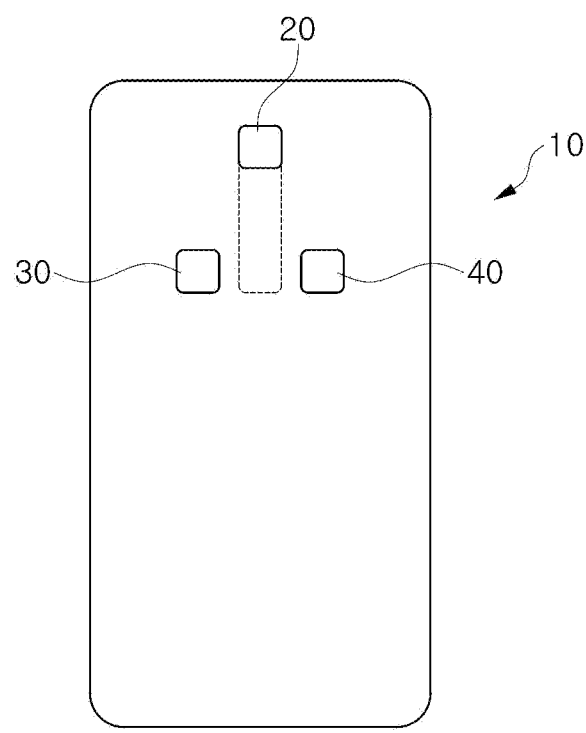

Referring to FIG. 28, the positions at which the telephoto optical imaging system 20, the first wide-angle optical imaging system 30, and the second wide-angle optical imaging system 40 are disposed are different from the positions at which they are disposed in FIG. 28.

In addition to the rear-facing optical imaging systems 20, 30, 40, and 50 in FIGS. 25-28, the portable electronic device 10 may be further equipped with a front-facing optical imaging system (not shown).

The examples described above describe how to implement an optical imaging system having a long focal length, i.e., a telephoto optical imaging system, that may be mounted in a portable electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, and a fifth lens sequentially disposed in ascending numerical order along an optical axis from an object-side surface of the first lens toward an imaging plane of the optical imaging system,
wherein the first to fifth lenses are the only lenses disposed between the object-side surface of the first lens and the imaging plane, and
the following conditional expression is satisfied:

$11 \leq TTL/IMG\_HT$ where TTL is a distance along the optical axis from the object-side surface of the first lens to the imaging plane, and IMG_HT is one-half of a diagonal length of the imaging plane.

2. The optical imaging system of claim 1, further comprising a first prism disposed between an object side of the optical imaging system and the object-side surface of the first lens,
wherein the first prism comprises a reflective surface configured to receive incident light from an object and reflect the incident light toward the first lens.

3. The optical imaging system of claim 2, wherein the following conditional expression is satisfied:

$8.0 \text{ mm} < DPL1 < 12.0 \text{ mm}$ where DPL1 is a distance in millimeters (mm) along the optical axis from an image-side surface of the first prism to the object-side surface of the first lens.

4. The optical imaging system of claim 2, wherein the following conditional expression is satisfied:

$40 \text{ mm} < PTTL < 70 \text{ mm}$ where PTTL is a distance in millimeters (mm) along the optical axis from the reflective surface of the first prism to the imaging plane.

5. The optical imaging system of claim 1, wherein the first lens has a positive refractive power.

6. The optical imaging system of claim 1, wherein the second lens has a negative refractive power.

7. The optical imaging system of claim 1, wherein the fourth lens has a convex image-side surface.

8. An optical imaging system comprising:
a first lens, a second lens, a third lens, a fourth lens, a fifth lens, and a sixth lens sequentially disposed in ascending numerical order along an optical axis from an object-side surface of the first lens toward an imaging plane of the optical imaging system,
wherein the first to sixth lenses are the only lenses disposed between the object-side surface of the first lens and the imaging plane and are each constituted by a single lens, and
the following conditional expression is satisfied:

$11 \leq TTL/IMG\_HT$ where TTL is a distance along the optical axis from the object-side surface of the first lens to the imaging plane, and IMG_HT is one-half of a diagonal length of the imaging plane.

9. The optical imaging system of claim 8, wherein the sixth lens has a concave object-side surface.

10. The optical imaging system of claim 1, further comprising a second prism disposed in an optical path between the fifth lens and the imaging plane,
wherein the second reflective member comprises a reflective surface configured to receive light from the fifth lens and reflect the light toward the imaging plane.

11. The optical imaging system of claim 1, wherein the first lens has a positive refractive power,
the object-side surface of the first lens is convex, and
the fourth lens has a convex image-side surface.

12. A portable electronic device comprising:
a first camera module comprising the optical imaging system of claim 1, and an image sensor disposed at the imaging plane of the optical imaging system;
a second camera module; and
a third camera module, wherein the image sensor of the first camera module is configured to convert light incident onto the image sensor through the first to fifth lenses of the optical imaging system of the first camera module into an electrical signal, the optical axis of the optical imaging system of the first camera module along which the first to fifth lenses are disposed is oriented in a first direction, an optical axis of the second camera module is oriented in a second direction substantially perpendicular to the first direction, and an optical axis of the third camera module is oriented in a third direction substantially parallel to the second direction and substantially perpendicular to the first direction.

13. The portable electronic device of claim 12, wherein the first camera module has a first angle of view and a first focal length, the second camera module has a second angle of view wider than the first angle of view and a second focal length shorter than the first focal length, and the third camera module has a third angle of view wider than the second angle of view and a third focal length shorter than the second focal length.

14. An optical imaging system comprising:

a first lens, a second lens, a third lens, a fourth lens, and a fifth lens sequentially disposed in ascending numerical order along an optical axis from an object-side surface of the first lens toward an imaging plane of the optical imaging system, wherein the first to fifth lenses are the only lenses disposed between the object-side surface of the first lens and the imaging plane, the following conditional expression is satisfied:

$$11 \leq TTL/IMG\_HT$$

where TTL is a distance along the optical axis from the object-side surface of the first lens to the imaging plane, and IMG_HT is one-half of a diagonal length of the imaging plane, the first lens has a non-circular shape when viewed in a direction of the optical axis, an image-side surface of the first lens has an effective radius that varies from a minimum effective radius that is a short axis effective radius L1S2es in a first direction perpendicular to the optical axis to a maximum effective radius that is a long axis effective radius L1S2el in a second direction perpendicular to the first direction and perpendicular to the optical axis, and the following conditional expression is satisfied:

$$0.8 < L1S2es/L1S2el < 1.0.$$

15. The optical imaging system of claim 14, wherein the following conditional expression is satisfied:

$$0 < D12/f \leq 0.05$$

where D12 is a distance along the optical axis from the image-side surface of the first lens to an object-side surface of the second lens, and f is a focal length of the optical imaging system.

16. The optical imaging system of claim 14, wherein the following conditional expression is satisfied:

$$0.5 < L1S2eMax/IMG\_HT < 2.20$$

where L1S2eMax is the maximum effective radius of the image-side surface of the first lens and is equal to L1S2el, and IMG_HT is one-half of the diagonal length of the imaging plane.

17. The optical imaging system of claim 14, further comprising a first prism disposed between an object side of the optical imaging system and the object-side surface of the first lens, wherein the first prism comprises a reflective surface configured to receive incident light from an object and reflect the incident light toward the first lens.

18. The optical imaging system of claim 17, wherein the object-side surface of the first lens has an effective radius that varies from a minimum effective radius that is a short axis effective radius L1S1es in the first direction perpendicular to the optical axis to a maximum effective radius that is a long axis effective radius L1S1el in the second direction perpendicular to the first direction and perpendicular to the optical axis, and the following conditional expression is satisfied:

$$0.07 < L1S1es/PTTL < 0.12$$

where PTTL is a distance along the optical axis from the reflective surface of the first prism to the imaging plane.

19. The optical imaging system of claim 14, further comprising a second prism disposed in an optical path between the fifth lens and the imaging plane, wherein the second reflective member comprises a reflective surface configured to receive light from the fifth lens and reflect the light toward the imaging plane.

20. The optical imaging system of claim 14, wherein the first lens has a positive refractive power, the object-side surface of the first lens is convex, and the fourth lens has a convex image-side surface.

21. A portable electronic device comprising:

a first camera module comprising the optical imaging system of claim 14 and an image sensor disposed at the imaging plane of the optical imaging system;

a second camera module; and a third camera module, wherein the image sensor of the first camera module is configured to convert light incident onto the image sensor through the first to fifth lenses of the optical imaging system of the first camera module into an electrical signal, the optical axis of the optical imaging system of the first camera module along which the first to fifth lenses are disposed is oriented in a first direction, an optical axis of the second camera module is oriented in a second direction substantially perpendicular to the first direction, and an optical axis of the third camera module is oriented in a third direction substantially parallel to the second direction and substantially perpendicular to the first direction.

22. The portable electronic device of claim 21, wherein the first camera module has a first angle of view and a first focal length, the second camera module has a second angle of view wider than the first angle of view and a second focal length shorter than the first focal length, and the third camera module has a third angle of view wider than the second angle of view and a third focal length shorter than the second focal length.

* * * * *